United States Patent
Lim et al.

(10) Patent No.: US 11,418,737 B2
(45) Date of Patent: Aug. 16, 2022

(54) IMAGE SIGNAL PROCESSOR AND ELECTRONIC DEVICE AND ELECTRONIC SYSTEM INCLUDING THE SAME

(71) Applicant: SAMSUNG ELECTRONICS CO., LTD., Suwon-si (KR)

(72) Inventors: Dong Pan Lim, Yongin-si (KR); Irina Kim, Suwon-si (KR); Young Il Seo, Seoul (KR); Jeong Guk Lee, Seoul (KR); Yun Seok Choi, Seoul (KR); Eun Doo Heo, Gyeongsangnam-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/404,198

(22) Filed: Aug. 17, 2021

(65) Prior Publication Data
US 2022/0086373 A1 Mar. 17, 2022

(30) Foreign Application Priority Data

Sep. 17, 2020 (KR) .................... 10-2020-0119874

(51) Int. Cl.
*H04N 5/359* (2011.01)
*G06N 3/04* (2006.01)
(Continued)

(52) U.S. Cl.
CPC ........... *H04N 5/359* (2013.01); *G06N 3/0454* (2013.01); *H04N 5/211* (2013.01); *H04N 5/2258* (2013.01); *H04N 5/2355* (2013.01)

(58) Field of Classification Search
CPC ...... H04N 5/359; H04N 5/211; H04N 5/2258; H04N 5/2355; G06N 3/0454
See application file for complete search history.

(56) References Cited

U.S. PATENT DOCUMENTS 8,502,756 B2 8/2013 Nakamura et al.
10,311,276 B2 6/2019 Mackey et al.
(Continued)

FOREIGN PATENT DOCUMENTS

KR  10-2020-0015095 A  2/2020
KR  10-2020-0073078 A  6/2020

*Primary Examiner* — Sinh Tran
*Assistant Examiner* — Zhenzhen Wu
(74) *Attorney, Agent, or Firm* — Sughrue Mion, PLLC

(57) ABSTRACT

An image processing device including a memory; and at least one image signal processor configured to: generate, using a first neural network, a feature value indicating whether to correct a global pixel value sensed during a unit frame interval, and generate a feature signal including the feature value; generate an image signal by merging the global pixel value with the feature signal; split a pixel value included in the image signal into a first sub-pixel value and a second sub-pixel value, split a frame feature signal included in the image signal into a first sub-feature value corresponding to the first sub-pixel value and a second sub-feature value corresponding to the second sub-pixel value, and generate a first sub-image signal including the first sub-pixel value and the first sub-feature value, and a second sub-image signal including the second sub-pixel value and the second sub-feature value; and sequentially correct the first sub-image signal and the second sub-image signal using a second neural network.

20 Claims, 21 Drawing Sheets

(51) Int. Cl.
*H04N 5/21* (2006.01)
*H04N 5/225* (2006.01)
*H04N 5/235* (2006.01)

(56) References Cited

U.S. PATENT DOCUMENTS

| | | |
|---|---|---|
| 10,664,676 B2 | 5/2020 | Mackey et al. |
| 10,664,718 B1 | 5/2020 | Rymkowski et al. |
| 2004/0257473 A1* | 12/2004 | Miyagawa ............. H04N 7/144 |
| | | 348/571 |
| 2020/0005100 A1* | 1/2020 | Kim ..................... G06V 10/431 |
| 2020/0073885 A1 | 3/2020 | Baijal et al. |
| 2020/0219467 A1* | 7/2020 | Okamoto ................. G09G 3/20 |
| 2021/0004941 A1* | 1/2021 | Hanwell ................... G06T 5/50 |

* cited by examiner

| G1 | B1 | G3 | R1 |
|----|----|----|----|
| B2 | G2 | R2 | G4 |
| G5 | R3 | G7 | B3 |
| R4 | G6 | B4 | G8 |

IMAGE SIGNAL PROCESSOR AND ELECTRONIC DEVICE AND ELECTRONIC SYSTEM INCLUDING THE SAME

CROSS-REFERENCE TO RELATED APPLICATION

This application is based on and claims priority under 35 U.S.C. § 119 to Korean Patent Application No. 10-2020-0119874 filed on Sep. 17, 2020 in the Korean Intellectual Property Office, the disclosure of which is incorporated by reference herein in its entirety.

BACKGROUND

1. Field

The disclosure relates to an image signal processor and an electronic device and an electronic system including the same.

2. Description of Related Art

An image sensing device is a semiconductor device that converts optical information into electrical signals. Examples of the image sensing device may include a charge coupled device (CCD) image sensing device and a complementary metal oxide semiconductor (CMOS) image sensing device.

A CMOS-type image sensor (CIS) may include a plurality of pixels arranged two-dimensionally. Each of the pixels may include, for example, a photodiode (PD). The photodiode may serve to convert incident light into an electrical signal.

With the development of the computer industry and the telecommunications industry, demands for image sensors with improved performance have been increased in various fields, such as digital cameras, camcorders, smartphones, game devices, security cameras, medical micro cameras, robots, and the like.

Recently, an image sensor may be disposed under a display panel of an electronic device. As the image sensor senses light passing through the display panel, information about the sensed light may be different from information about actual light. For example, the quality of an image output by the image sensor, which senses light that has passed through the display panel, may be deteriorated compared to the quality of an image output by an image sensor which senses light that has not passed through the display panel. Therefore, a method for solving this problem is required.

SUMMARY

Provided is an image signal processor in which product reliability is improved by enhancing image quality.

Also provided is an electronic device in which product reliability is improved by enhancing image quality.

Also provided is an electronic system in which product reliability is improved by enhancing image quality.

Additional aspects will be set forth in part in the description which follows and, in part, will be apparent from the description, or may be learned by practice of the presented embodiments.

In accordance with an aspect of the disclosure, an image processing device includes a memory; and at least one image signal processor configured to: generate, using a first neural network, a feature value indicating whether to correct a global pixel value sensed during a unit frame interval, and generate a feature signal including the feature value; generate an image signal by merging the global pixel value with the feature signal; split a pixel value included in the image signal into a first sub-pixel value and a second sub-pixel value, split a frame feature signal included in the image signal into a first sub-feature value corresponding to the first sub-pixel value and a second sub-feature value corresponding to the second sub-pixel value, and generate a first sub-image signal including the first sub-pixel value and the first sub-feature value, and a second sub-image signal including the second sub-pixel value and the second sub-feature value; and sequentially correct the first sub-image signal and the second sub-image signal using a second neural network.

In accordance with an aspect of the disclosure, an electronic device includes an image sensor configured to sense light passing through a display, and output a first image signal including a global pixel value sensed during a unit frame interval; and an image signal processor connected to the image sensor and configured to: receive the first image signal; generate a second image signal obtained by correcting the global pixel value included in the first image signal using a first neural network; split the first image signal into a first sub-image signal and a second sub-image signal, and split the second image signal into a third sub-image signal and a fourth sub-image signal; and generate a first signal based on the first sub-image signal and the third sub-image signal using a second neural network, and generate a second signal based on the second sub-image signal and the fourth sub-image signal.

In accordance with an aspect of the disclosure, an electronic system includes an electronic device including an image sensor, an image signal processor and a communication processor; and a data center configured to exchange data with the communication processor, wherein the image sensor is configured to output a first image signal including a global pixel value sensed during a unit frame interval, and provide the first image signal to the image signal processor, wherein the image signal processor is configured to generate a second image signal using a first neural network based on a first weight and the first image signal provided from the image sensor, and generate a third image signal using a second neural network different from the first neural network based on a second weight, the first image signal, and the second image signal, wherein the communication processor is configured to provide the first weight, the second weight, the first image signal, and the third image signal to the data center, and the data center is configured to generate a third weight obtained by correcting the first weight, and a fourth weight obtained by correcting the second weight, based on the first weight, the second weight, the first image signal, and the third image signal, and provide the third weight and the fourth weight to the electronic device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a diagram for describing an image signal according to embodiments.

DETAILED DESCRIPTION OF THE EMBODIMENTS

Hereinafter, embodiments will be described with reference to the accompanying drawings. The embodiments described herebelow are all exemplary, and thus, the inventive concept is not limited to these embodiments disclosed below and may be realized in various other forms. Like numerals refer to like elements throughout.

As is traditional in the field, embodiments may be described and illustrated in terms of blocks which carry out a described function or functions. These blocks, which may be referred to herein as units or modules or the like, or by names such as corrector, splitter, merger, combiner, encoder, decoder, network, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Hereinafter, an electronic device including an image sensor 100 will be described with reference to FIGS. 1 to 3.

Figure 1:
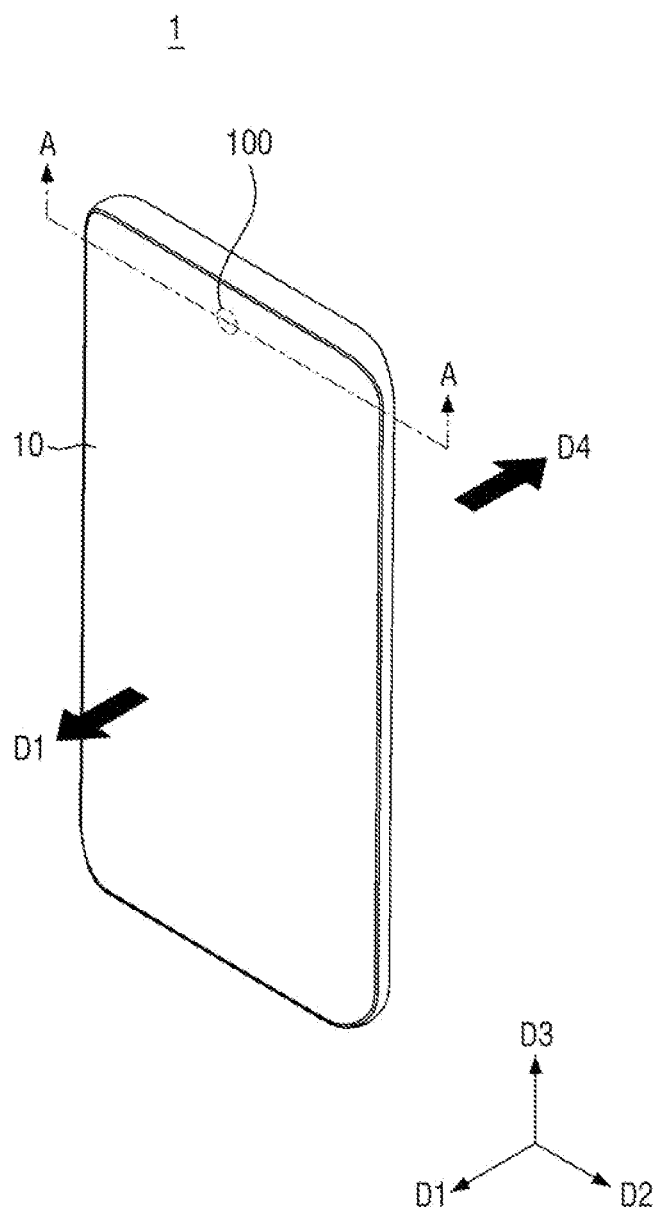
FIG. 1 is a perspective view illustrating an electronic device according to embodiments.

FIG. 1 is a perspective view illustrating an electronic device according to some embodiments. FIG. 2 is a cross-sectional view of the electronic device taken along line A-A of FIG. 1. FIG. 3 is a perspective view of the electronic device of FIG. 1 as viewed in a first direction.

Figure 2:
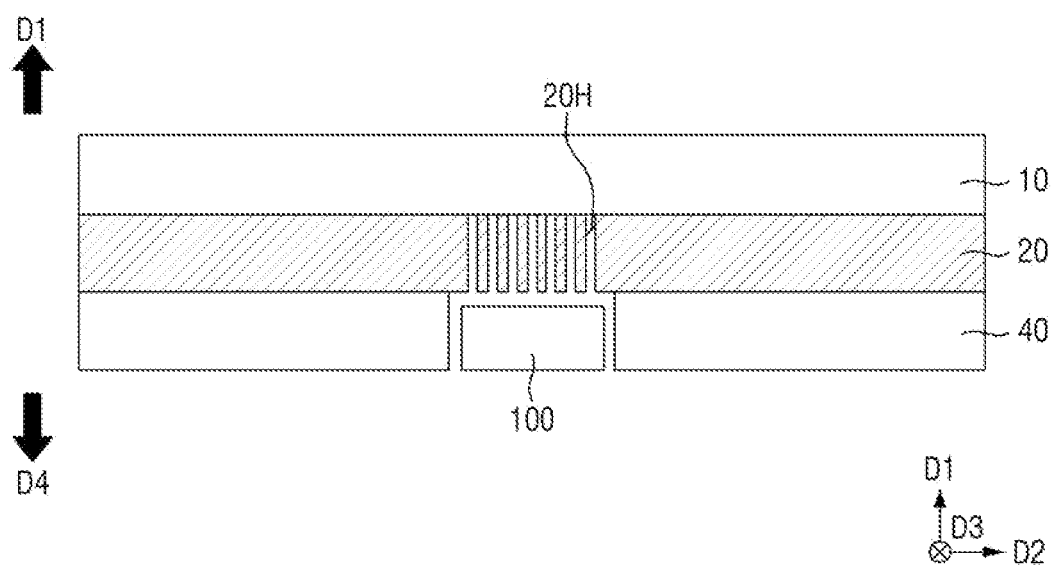
FIG. 2 is a cross-sectional view of the electronic device taken along line A-A of FIG. 1, according to embodiments.
Figure 3:
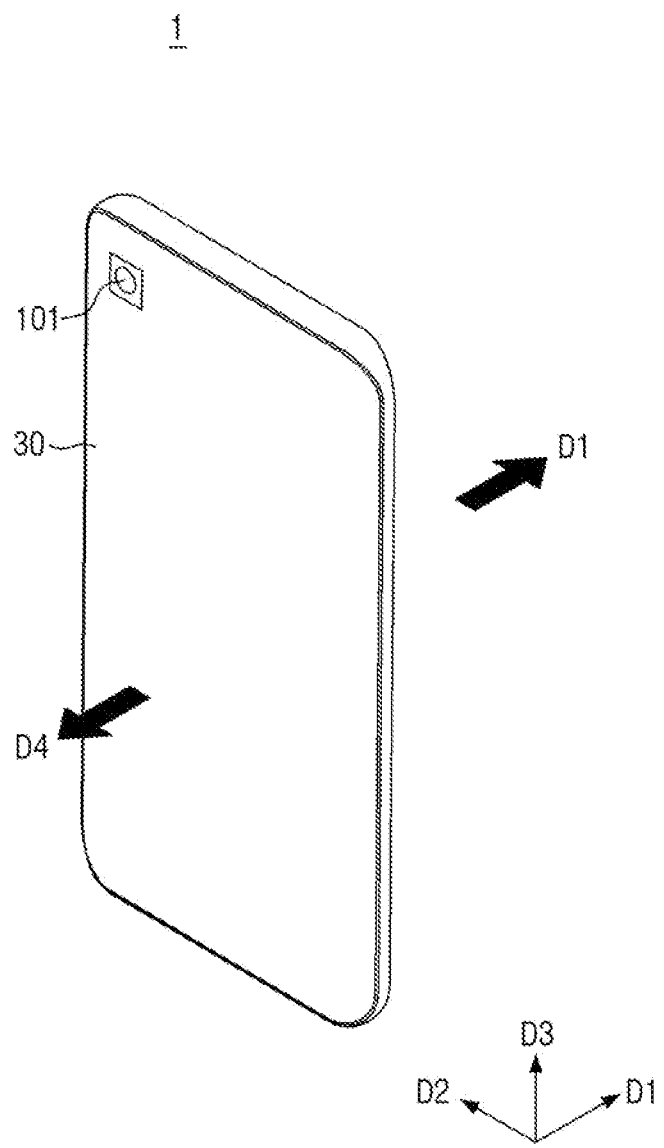
FIG. 3 is a perspective view of the electronic device of FIG. 1 as viewed in a first direction, according to embodiments.

Referring to FIGS. 1 to 3, an electronic device 1 may include a cover glass 10, a display 20, a rear glass 30, a back cover 40, the image sensor 100, an image sensor 101, and the like.

In some embodiments, the electronic device 1 may include a housing. For example, the housing may include the cover glass 10 that faces a first direction D1 and the rear glass 30 that faces a fourth direction opposite to the first direction D1. Further, the housing may include, for example, a connection part that connects the cover glass 10 to the rear glass 30. The housing may protect components inside the electronic device 1 from the outside.

The cover glass 10 may include a transparent material so that electrical information signals displayed by the display 20 may be recognized from the outside. For example, the cover glass 10 may include glass or plastic.

The cover glass 10 and the rear glass 30 may have a flat shape. For example, each of the cover glass 10 and the rear glass 30 may have lengths in a second direction D2 and a third direction D3 greater than the length or thickness in the first direction D1. Accordingly, the electronic device 1 may have a flat shape. However, embodiments are not limited thereto.

The surface of the electronic device 1 in the first direction D1 may be a front surface, and the surface of the electronic device 1 in the fourth direction D4 may be a rear surface. However, this is exemplary, and embodiments are not limited.

Referring to FIGS. 1 and 2, the cover glass 10 may cover the display 20. For example, the display 20 may be disposed in the fourth direction D4 from the cover glass 10.

The display 20 may include a plurality of pixels arranged along rows and columns. For example, the display 20 may include an organic light emitting diode display (OLED), a liquid crystal display (LCD), a plasma display panel (PDP), an electrochromic display (ECD), a digital mirror device (DMD), an actuated mirror device (AMD), a grating light valve (GLV) device, an electroluminescent display (ELD), and the like.

The display 20 may include a plurality of display holes 20H. The display holes 20H may be holes passing through the display 20 in the first direction D1. For example, the pixels of the display 20 may not be disposed in the display holes 20H. However, embodiments are not limited thereto.

The display 20 may output an image provided from the electronic device 1. For example, signals are transmitted to the plurality of pixels, so that the display 20 may output a corresponding image. For example, the display 20 may include a touch screen or a touch panel that displays images or receives an input by a user's touch.

The image sensor 100 may sense light incident through the display 20 from the outside of the electronic device 1, or a part or portion of light output from the display 20. For example, the image sensor 100 may be covered by the display 20 and may sense light, which is incident from the outside of the electronic device 1. For example, the image sensor 100 may sense light output from the display 20 and reflected by the cover glass 10. Further, the image sensor 100 may sense light having passed through the display hole 20H. For example, the image sensor 100 may sense light passing through the cover glass 10 and the pixels of the display 20, and a gap between the pixels of the display 20.

Accordingly, an image generated by sensing the light passed through the display 20 may be distorted by the cover glass 10, the display holes 20H, and the pixels of the display 20. For example, light incident through the display holes 20H may be diffracted, and an image generated by sensing the diffracted light may be distorted. For example, the distorted image may be an image in which a flare, haze, blur, or ghost occurs. However, embodiments are not limited thereto.

The image sensor 100 may be covered by the display 20, and surrounded by the back cover 40. For example, the image sensor 100 may be disposed in an opening formed in the back cover 40.

The back cover 40 may prevent light generated inside the electronic device 1 from affecting the display 20. Further, the back cover 40 may prevent light output from the display 20 from entering the inside of the electronic device 1.

Referring to FIG. 3, the rear glass 30 may be disposed at the rear surface, for example the surface of the electronic device 1 in the fourth direction D4, of the electronic device 1. Further, the image sensor 101 may be disposed at the rear surface, for example the surface of the electronic device 1 in the fourth direction D4, of the electronic device 1. However, embodiments are not limited thereto, and the image sensor 101 may be disposed at the side surface or the front surface.

Although one image sensor 101 is illustrated, in embodiments the image sensor 101 may include a plurality of image sensors. For example, the image sensor 101 may include a regular camera, a wide-angle camera, and a telephoto camera. The rear glass 30 may prevent light from entering the electronic device 1 from the outside. That is, it is possible to prevent light from entering portions other than the opening in which the image sensor 101 is disposed.

Hereinafter, an image sensing system 2 including the image sensor 100, a pixel array 140, a first image signal processor 200, and an application processor 300 will be described with reference to FIGS. 4 to 7.

Figure 4:
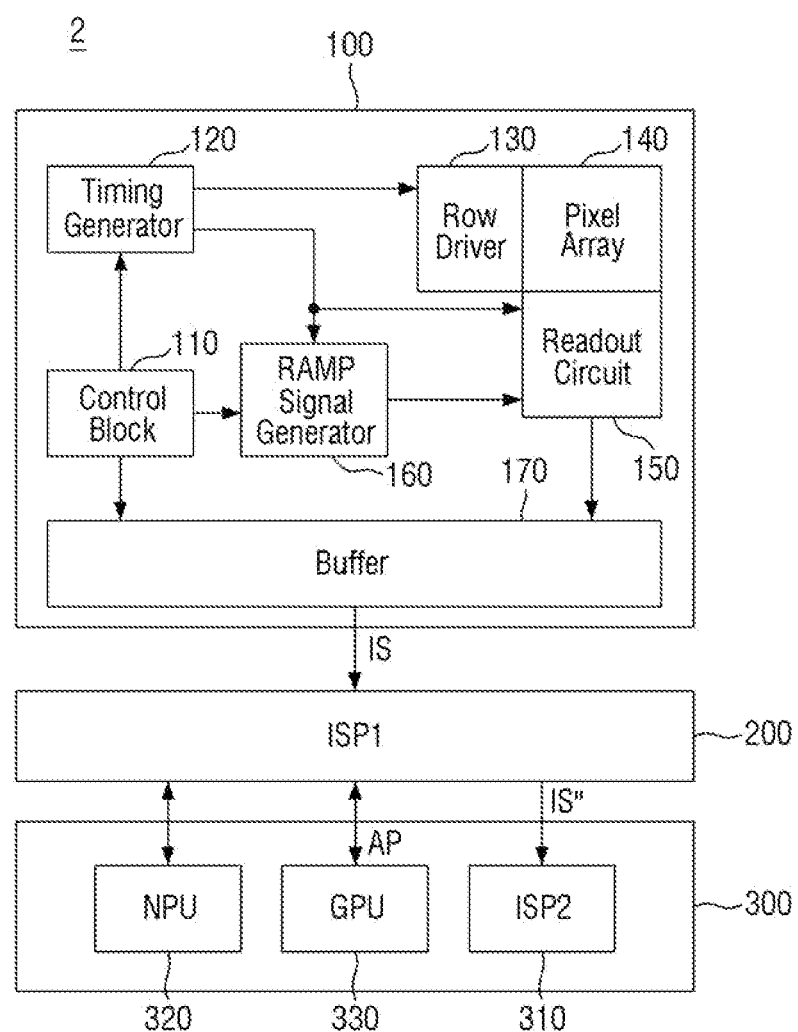
FIG. 4 is a block diagram illustrating an image sensing system according to embodiments.

FIG. 4 is a block diagram illustrating an image sensing system according to some embodiments.

Referring to FIG. 4, the image sensing system 2 may include the image sensor 100, the first image signal processor 200, and the application processor 300.

The image sensor 100 may generate an image signal IS by sensing an image of a sensing target using incident light. In some embodiments, the generated image signal IS may be, for example, a digital signal, but embodiments are not limited thereto.

The image signal IS may be provided to and processed by the first image signal processor 200. For example, the first image signal processor 200 may process the image signal IS to generate an image signal IS".

The application processor 300 may receive the image signal IS" from the first image signal processor 200. The application processor 300 may alter or process the image signal IS" to be suitable for display. For example, a second image signal processor 310 included in the application processor 300 may perform image processing on the image signal IS".

The application processor 300 may include a neural processor 320, a graphics processor 330, and the like. In this case, the neural processor 320 may perform processing such as neural networking, machine learning or deep learning, and the graphics processor 330 may perform graphics processing. The neural processor 320 and the graphics processor 330 may exchange signals with the first image signal processor 200. For example, the neural processor 320 and the graphics processor 330 may receive data from the first image signal processor 200 and may output processed data. Thereafter, the neural processor 320 and the graphics processor 330 may return the processed data to the first image signal processor 200. However, embodiments are not limited thereto, and the neural processor 320 and the graphics processor 330 may be included in the first image signal processor 200.

In some embodiments, the image sensor 100, the first image signal processor 200, and the application processor 300 may be disposed separately as illustrated. For example, the image sensor 100 and the first image signal processor 200 may be mounted on a first chip, and the application processor 300 may be mounted on a second chip, so that they may communicate through an interface. However, embodiments are not limited thereto, and the image sensor 100 and the first image signal processor 200, and the application processor 300 may be implemented in one package, for example, a multi-chip package (MCP).

The image sensor 100 may include a control register block 110, a timing generator 120, a row driver 130, the pixel array 140, a readout circuit 150, a ramp signal generator 160, and a buffer 170.

The control register block 110 may control the overall operation of the image sensor 100. In particular, the control register block 110 may directly transmit operation signals to the timing generator 120, the ramp signal generator 160 and the buffer 170.

The timing generator 120 may generate a reference signal for operation timing of various components of the image sensor 100. The reference signal for operation timing generated by the timing generator 120 may be transmitted to the row driver 130, the readout circuit 150, the ramp signal generator 160, and the like.

The ramp signal generator 160 may generate and transmit a ramp signal used in the readout circuit 150. For example, the readout circuit 150 may include a correlated double sampler (CDS), a comparator, and the like, and the ramp signal generator 160 may generate and transmit the ramp signal used in the correlated double sampler (CDS), the comparator, and the like.

The buffer 170 may include, for example, a latch. The buffer 170 may temporarily store the image signal IS to be provided to the outside, and transmit the image signal IS to an external memory or an external device.

The pixel array 140 may sense an external image. The pixel array 140 may include a plurality of pixels (or unit pixels). The row driver 130 may selectively activate a row of the pixel array 140.

The readout circuit 150 may sample a pixel signal provided from the pixel array 140, compare it with the ramp signal, and convert an analog image signal, or for example data of an analog image signal, into a digital image signal, or for example data of a digital image signal, based on the comparison result.

Figure 5:
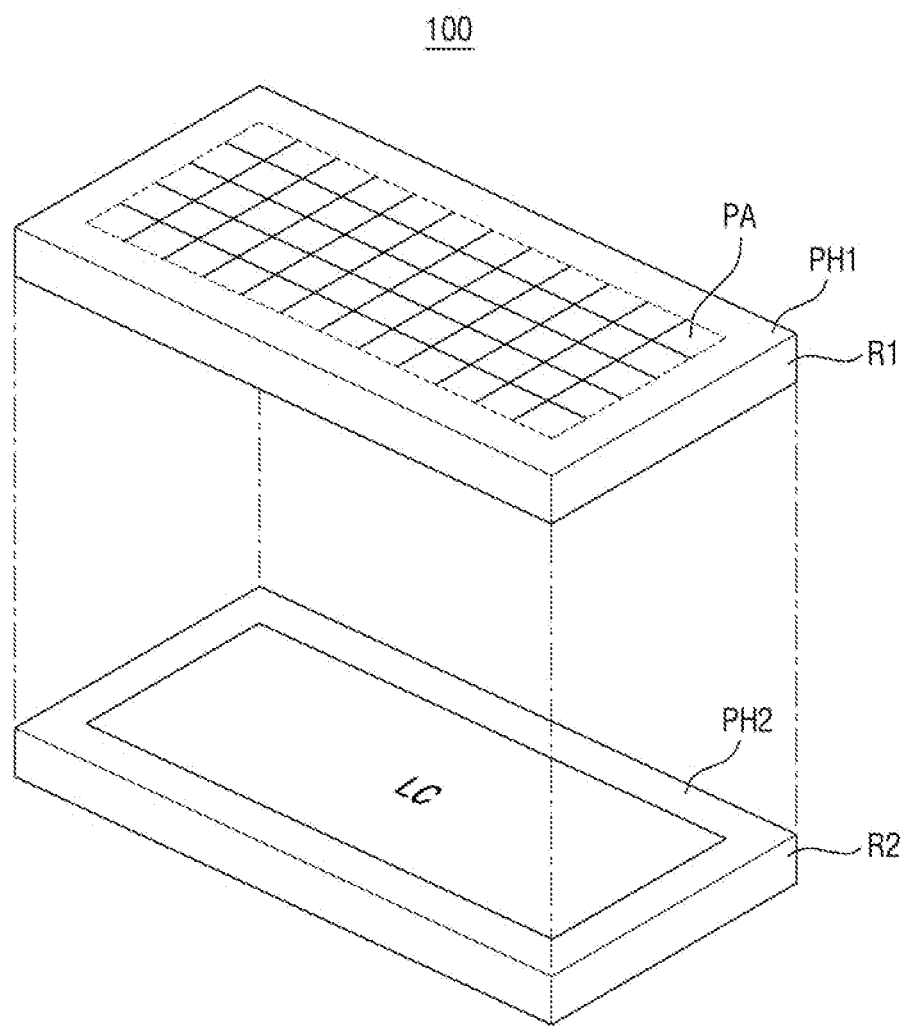
FIG. 5 is a diagram for describing a conceptual layout of the image sensor of FIG. 4, according to embodiments.

FIG. 5 is a diagram for describing a conceptual layout of the image sensor of FIG. 4.

Referring to FIG. 5, the image sensor 100 may include first and second regions R1 and R2 stacked in the first direction D1, for example a vertical direction. As illustrated, the first and second regions R1 and R2 may extend in the second direction D2 and the third direction D3 that cross the first direction, and the blocks shown in FIG. 4 may be disposed in the first and second regions R1 and R2. In embodiments, the first and second regions R1 and R2 may be stacked in other directions, and the first and second regions R1 and R2 may extend in other directions.

In embodiments, a memory may be arranged in a third region, and the third region may be disposed under the second region R2. In this case, the memory disposed in the third region may receive image data from the first and second regions R1 and R2, store or process the image data, and retransmit the image data to the first and second regions R1 and R2. In this case, the memory may include a memory element, such as a dynamic random access memory (DRAM), a static random access memory (SRAM), a spin transfer torque magnetic random access memory (STT-MRAM), and a flash memory. When the memory includes, for example, a DRAM, the memory may receive and process the image data at a relatively high speed. Further, in some embodiments, the memory may be disposed in the second region R2.

The first region R1 may include a pixel array PA and a first peripheral area PH1, and the second region R2 may include a logic circuit area LC and a second peripheral area PH2. The first and second regions R1 and R2 may be sequentially stacked vertically.

In the first region R1, the pixel array PA may be the same as the pixel array 140 described with reference to FIG. 4. The pixel array PA may include a plurality of unit pixels arranged in a matrix. Each pixel may include a photodiode and transistors.

The first peripheral area PH1 may include a plurality of pads and may be disposed around the pixel array PA. The pads may transmit/receive electrical signals to/from the external device.

In the second region R2, the logic circuit area LC may include electronic elements having a plurality of transistors. The electronic elements included in the logic circuit area LC may be electrically connected to the pixel array PA to provide a constant signal to each unit pixel of the pixel array PA or control the output signal.

In the logic circuit area LC, for example, the control register block 110, the timing generator 120, the row driver 130, the readout circuit 150, the ramp signal generator 160 and the buffer 170 described with reference to FIG. 4 may be disposed. For example, among the blocks of FIG. 4, the blocks other than the pixel array 140 may be disposed in the logic circuit area LC.

Also, in the second region R2, the second peripheral area PH2 may be disposed in an area corresponding to the first peripheral area PH1 of the first region R1, but embodiments are not limited thereto.

Figure 6:
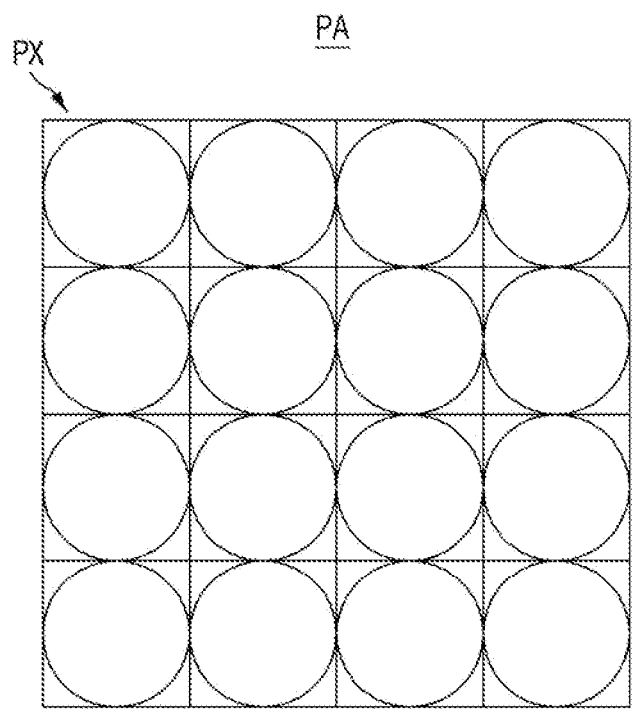
FIG. 6 is a diagram for describing a pixel array according to some embodiments.

FIG. 6 is a diagram for describing a pixel array according to some embodiments.

Referring to FIG. 6, the pixel array PA may include a plurality of unit pixels PX. The plurality of unit pixels PX may be two-dimensionally arranged. For example, the plurality of unit pixels PX may be repeatedly arranged in the second and third directions. The unit pixels PX may be arranged at regular intervals. For example, the pixel array PA may be arranged in a Bayer pattern. However, embodiments are not limited thereto, and the pixel array PA may be arranged in a tetra pattern, a nona pattern, or the like.

Figure 7:
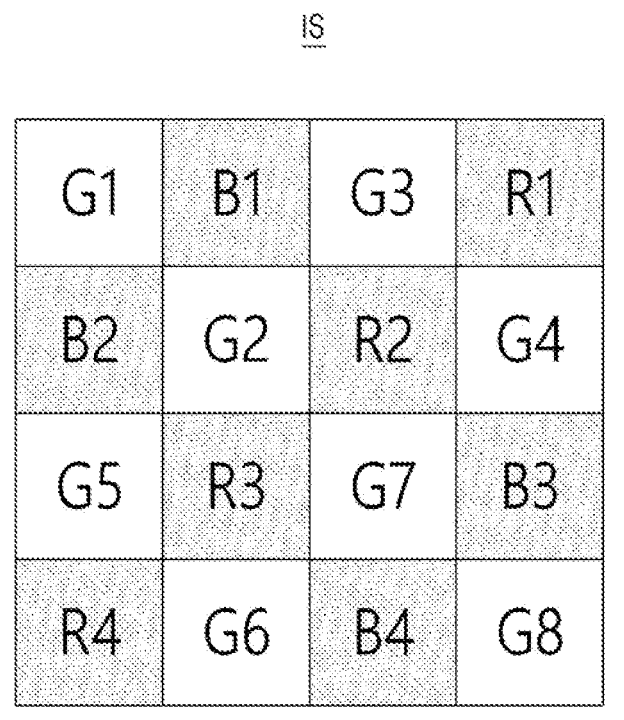

FIG. 7 is a diagram for describing an image signal according to some embodiments.

Referring to FIG. 7, the image signal IS may be a signal output by the image sensor 100 sensing light from the pixel array PA. For example, light may pass through color filters of the pixel array 140 to reach photodiodes, and the image signal IS may be output from the logic circuit area LC.

For example, the image signal IS may include first to eighth green pixel values G1 to G8 output by sensing light having passed through color filters having a green color. Further, the image signal IS may include first to fourth blue pixel values B1 to B4 output by sensing light having passed through color filters having a blue color. Further, the image signal IS may include first to fourth red pixel values R1 to R4 output by sensing light having passed through color filters having a red color.

That is, the first to eighth green pixel values G1 to G8, the first to fourth blue pixel values B1 to B4, and the first to fourth red pixel values R1 to R4 shown in FIG. 7 may generate the image signal IS that is output by sensing light having passed through the respective color filters having the corresponding colors by the image sensor 100.

The pixel array 140 may be arranged in a red-green-blue (RGB) Bayer pattern. That is, the color filters of the pixel array 140 may be a combination of a red color filter, a green color filter, and a blue color filter, and may be arranged in a Bayer type. However, embodiments are not limited thereto, and the pixel array 140 may be an RGB tetra pattern, an RGB nona pattern, or the like.

In the image signal IS, the pixel values may be arranged to correspond to the colors of the color filters of the pixel array 140 as illustrated in FIG. 7. However, FIG. 7 is only an illustration of arranging the respective pixel values according to the positions of the respective unit pixels PX, and the storage positions of the pixel values of the actually output image signal IS are not limited to the illustrated positions.

Figure 8:
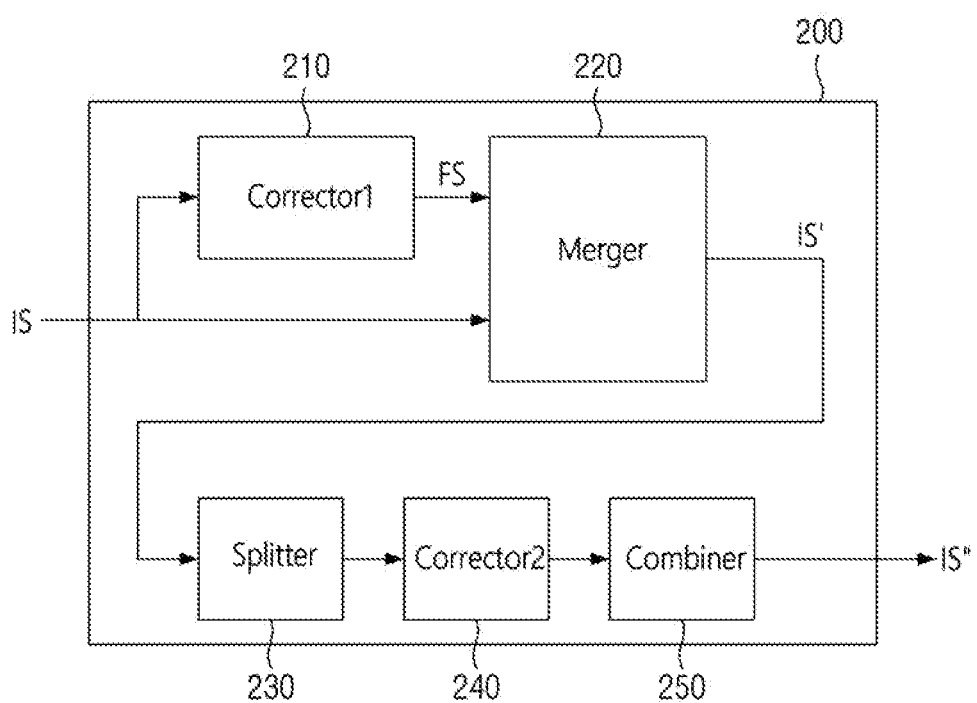
FIG. 8 is a block diagram illustrating a first image signal processor according to embodiments.
Figure 9:
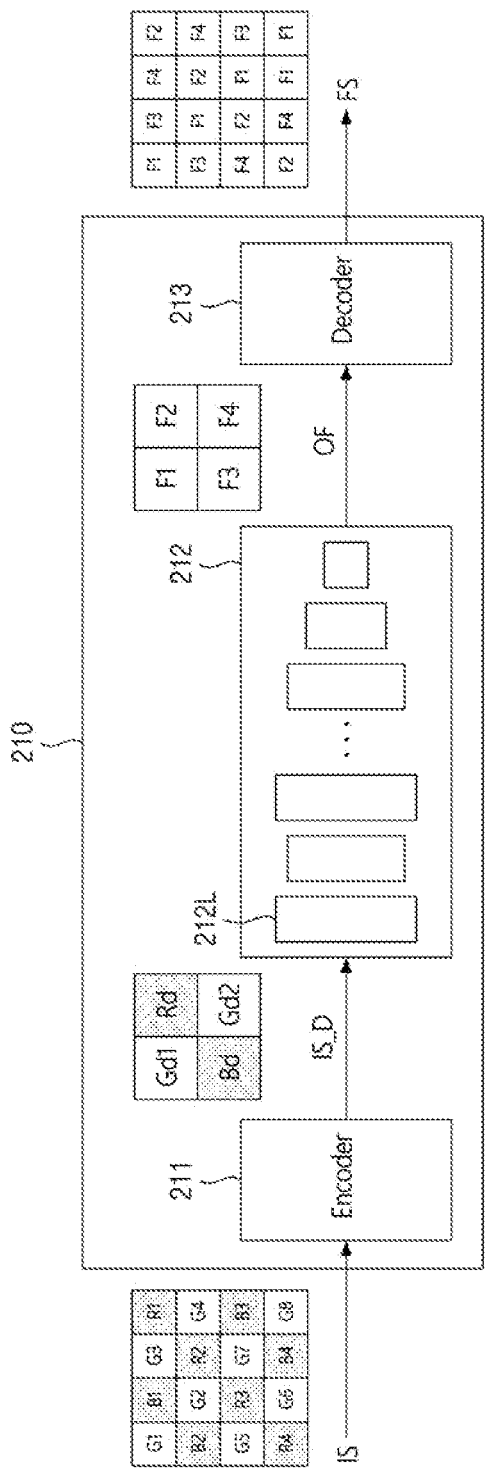
FIGS. 9 to 10 are block diagrams illustrating operations of a first corrector and a merger of FIG. 8, according to embodiments.
Figure 10:
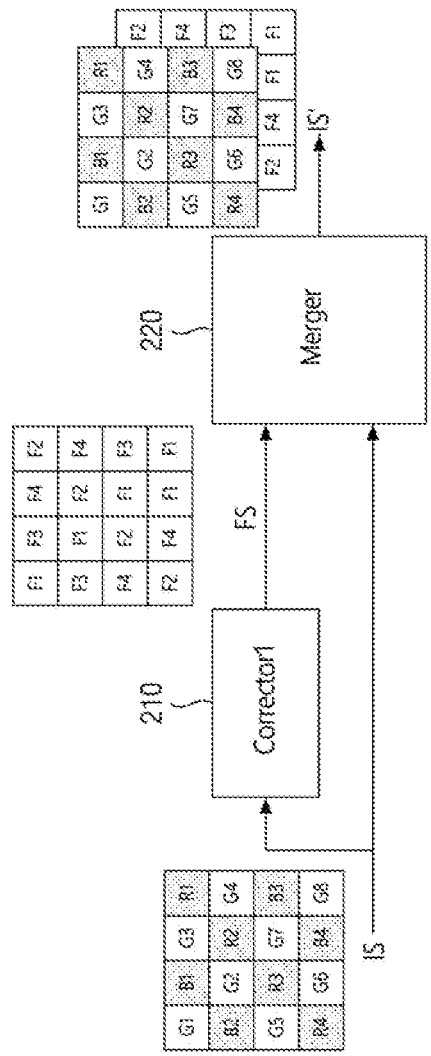
Figure 11:
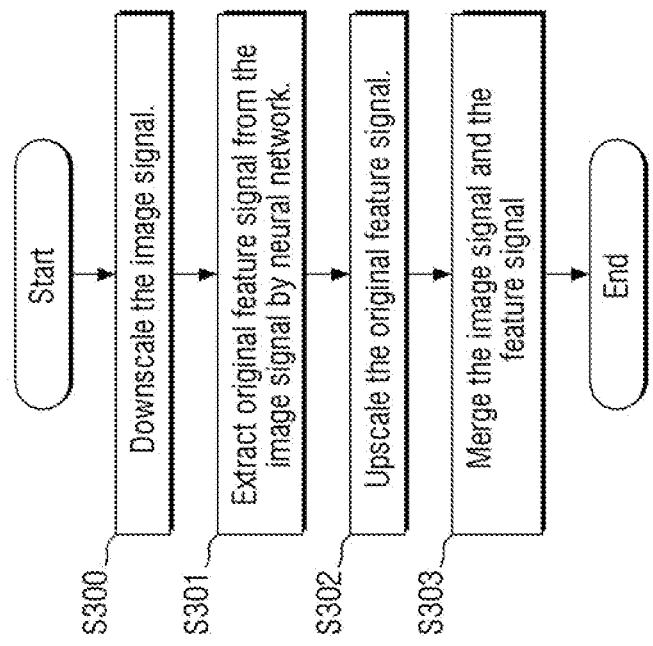
FIG. 11 is a flowchart for explaining the operations of the first corrector and the merger of FIG. 8, according to embodiments.

FIG. 8 is a block diagram illustrating a first image signal processor according to some embodiments. FIGS. 9 to 10 are block diagrams illustrating operations of a first corrector and a merger of FIG. 8. FIG. 11 is a flowchart for explaining the operations of the first corrector and the merger of FIG. 8.

Referring to FIG. 8, the first image signal processor 200 may include a first corrector 210, a merger 220, a splitter 230, a second corrector 240 and a combiner 250. The first corrector 210, the merger 220, the splitter 230, the second corrector 240, and the combiner 250 may be connected in that order, but embodiments are not limited thereto.

The first corrector 210 may receive the image signal IS from the image sensor 100, and may generate feature values indicating whether to correct the pixel values, based on the received image signal IS. Further, the first corrector 210 may provide a feature signal FS including the generated feature values to the merger 220.

Referring to FIG. 9, an image signal IS may be the image signal IS of FIG. 7. For example, the image signal IS may include the pixel values sensed through the pixel array PA of FIG. 6. For example, the image signal IS may include the first to eighth green pixel values G1 to G8, the first to fourth blue pixel values B1 to B4, and the first to fourth red pixel values R1 to R4.

In this case, the image signal IS may include global pixel values sensed during a unit frame interval. In some embodiments, the global pixel values may include an entirety of the pixel values sensed by the image sensor 100. For example, the global pixel values may include all pixel values sensed during the unit frame interval. However, embodiments are not limited thereto, and the global pixel values may include only some pixel values sensed during the unit frame interval. For example, the global pixel values may include pixel values sampled by an encoder or the like.

Further, the image signal IS may include local pixel values that are a part of the global pixel values. The local pixel values may be pixel values generated by only a part of the pixel array PA. In embodiments, the local pixel values may be pixel values sampled from the pixel values generated by the pixel array PA.

Assuming that the image signal IS includes all pixel values sensed during the unit frame interval, if the image sensor 100 generates the image signals IS at 60 frames per second (fps), the image signal IS may include all pixel values sensed for 1/60th of a second, which may be a unit frame interval corresponding to 60 fps. That is, the image signal IS may include the first to eighth green pixel values G1 to G8, the first to fourth blue pixel values B1 to B4, and the first to fourth red pixel values R1 to R4 sensed during the unit frame interval. However, embodiments are not limited thereto, and the image signal IS may include some of the first to eighth green pixel values G1 to G8, the first to fourth blue pixel values B1 to B4 and the first to fourth red pixel values R1 to R4 sensed during the unit frame interval.

In embodiments, the first image signal processor 200 may include a frame memory. The frame memory may be connected to the first corrector 210 and may receive the image signal IS from the image sensor 100 to temporarily store it. In this case, the frame memory may store pixel values sensed during a unit frame interval. Then, the frame memory may provide the image signal IS temporarily stored to the first corrector 210. However, embodiments are not limited thereto, and the first image signal processor 200 may include a line memory or a block memory rather than the frame memory.

Referring back to FIG. 9, the first corrector 210 may include an encoder 211, a first neural network 212, and a decoder 213.

The encoder 211 may receive the image signal IS. Referring to FIG. 11, the encoder 211 may downscale the image signal IS at operation S300. The encoder 211 may generate a downscaled image signal IS_D by encoding the image signal IS. For example, the encoder 211 may generate the downscaled image signal IS_D by sampling.

For example, the encoder 211 may encode the first to eighth green pixel values G1 to G8, the first to fourth blue pixel values B1 to B4, and the first to fourth red pixel values R1 to R4 to generate downscaled pixel values Gd1, Rd, Bd and Gd2. In this case, because the first to eighth green pixel values G1 to G8, the first to fourth blue pixel values B1 to B4, and the first to fourth red pixel values R1 to R4 are the global pixel values sensed during the unit frame interval and the downscaled pixel values Gd1, Rd, Bd and Gd2 are generated by downscaling the global pixel values, the downscaled pixel values Gd1, Rd, Bd and Gd2 may correspond to the global pixel values sensed during the unit frame interval. Alternatively, the downscaled pixel values Gd1, Rd, Bd and Gd2 may be local pixel values sensed during the unit frame interval.

The first neural network 212, and the neural processor 320 performing the neutral networking and the graphics processor 330 may have memory limitations in processing images. For example, when the first neural network 212 processes the image signal IS including global pixel values sensed during a unit frame interval without changing it, for example without downscaling, the processing performance of the first neural network 212 may be deteriorated. Accordingly, as the image signal IS is downscaled or downsized through encoding of the encoder 211, the processing performance of the first neural network 212 may be further enhanced.

The first neural network 212 may receive the downscaled image signal IS_D. The first neural network 212 may include a plurality of convolutional layers 212L. Referring to FIG. 11, the first corrector 210 may extract an original feature signal OF from the image signal IS through the first neural network 212 at operation S301. The first neural network 212 may process the downscaled image signal IS_D using the convolutional layers 212L, and as a result, may output the original feature signal OF.

For example, the downscaled pixel values Gd1, Rd, Bd and Gd2 included in the downscaled image signal IS_D may pass through the convolutional layers 212L, so that the first to fourth feature values F1 to F4 may be output. In this case, the first to fourth feature values F1 to F4 may be extracted from the downscaled pixel values Gd1, Rd, Bd and Gd2.

The first to fourth feature values F1 to F4 may correspond to the downscaled pixel values Gd1, Rd, Bd and Gd2. For example, the first to fourth feature values F1 to F4 may include feature values indicating whether to correct the downscaled pixel values Gd1, Rd, Bd and Gd2. For example, the first feature value F1 may represent a probability of whether the downscaled pixel value Gd1 includes a flare or haze. For example, if the downscaled pixel value Gd1 includes a flare, the first feature value F1 may be 1. Alternatively, if the downscaled pixel value Gd1 does not include a flare, the first feature value F1 may be 0. However, embodiments are not limited thereto.

The decoder 213 may receive the original feature signal OF. Referring to FIG. 11, the decoder 213 may upscale the original feature signal OF at operation S302. The decoder 213 may decode the original feature signal OF to upscale it, thereby generating the feature signal FS. For example, the decoder 213 may generate the feature signal FS using interpolation.

For example, the decoder 213 may generate the upscaled feature signal FS by decoding the first to fourth feature values F1 to F4. In this case, the feature values of the feature signal FS may include the first to fourth feature values F1 to F4, but embodiments are not limited thereto.

The feature signal FS may have the same size as the image signal IS. That is, the decoder 213 may generate the feature signal FS having the same size as the image signal IS by resizing the original feature signal OF. That is, the feature values of the feature signal FS may correspond to the global pixel values of the image signal IS, which are sensed during the unit frame interval.

Through encoding of the encoder 211, feature value extraction of the first neural network 212, and decoding of the decoder 213 in the first corrector 210, the feature signal FS, which includes the feature values indicating whether to correct a flare or haze that requires processing on the entire image signal IS, may be generated. Accordingly, the feature signal FS may be effectively generated without being limited by the performances of the first neural network 212, the neural processor 320, and the graphics processor 330.

Referring to FIG. 10, the merger 220 may receive the feature signal FS and the image signal IS. Referring to FIG. 11, the merger 220 may merge the feature signal FS and the image signal IS at operation S303. That is, the merger 220 may output an image signal IS', in which the feature signal FS and the image signal IS are merged.

The merger 220 may make the feature values of the feature signal FS correspond to the pixel values of the image signal IS. For example, the first to eighth green pixel values G1 to G8, the first to fourth blue pixel values B1 to B4, and the first to fourth red pixel values R1 to R4 of the image signal IS may correspond to the first to fourth pixel values F1 to F4 of the feature signal FS. In this case, because the image signal IS has the same size as the feature signal FS, each pixel value may correspond to each feature value. However, embodiments are not limited thereto, and the merger 220 may merge the image signal IS and the feature signal FS in a simpler manner.

Figure 12:
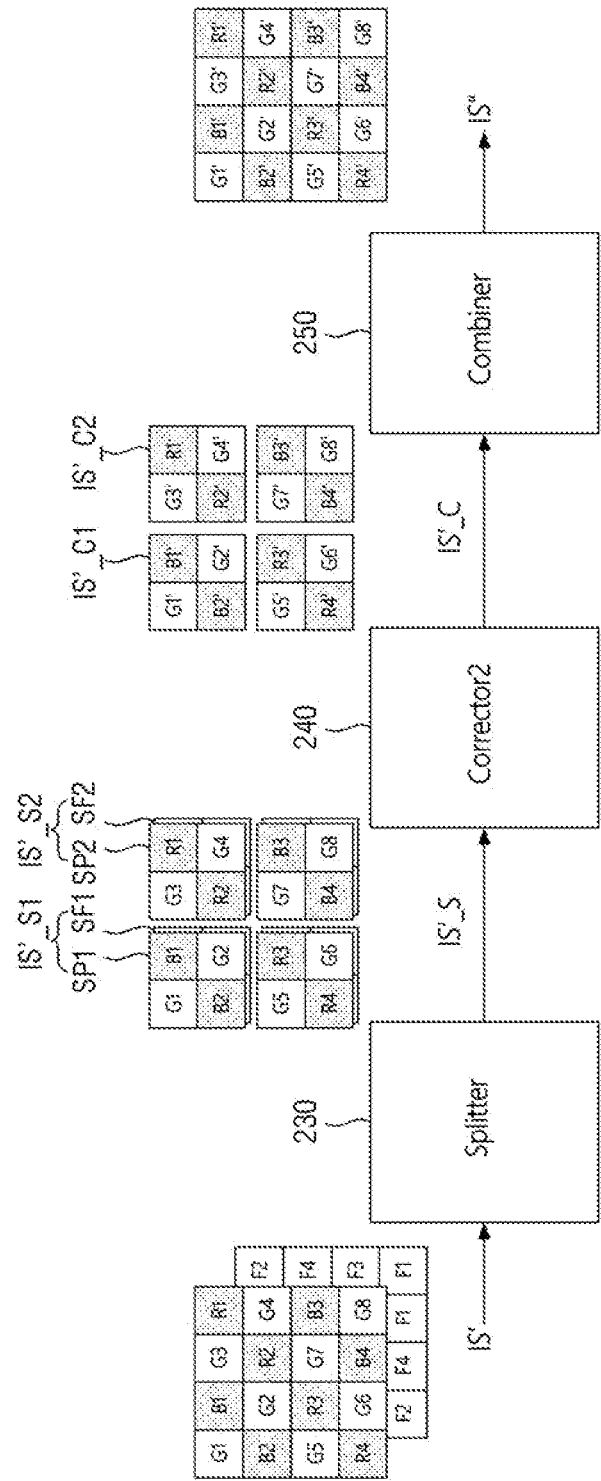
FIG. 12 is a block diagram illustrating operations of the splitter, the second corrector, and the combiner of FIG. 8, according to embodiments.
Figure 13:
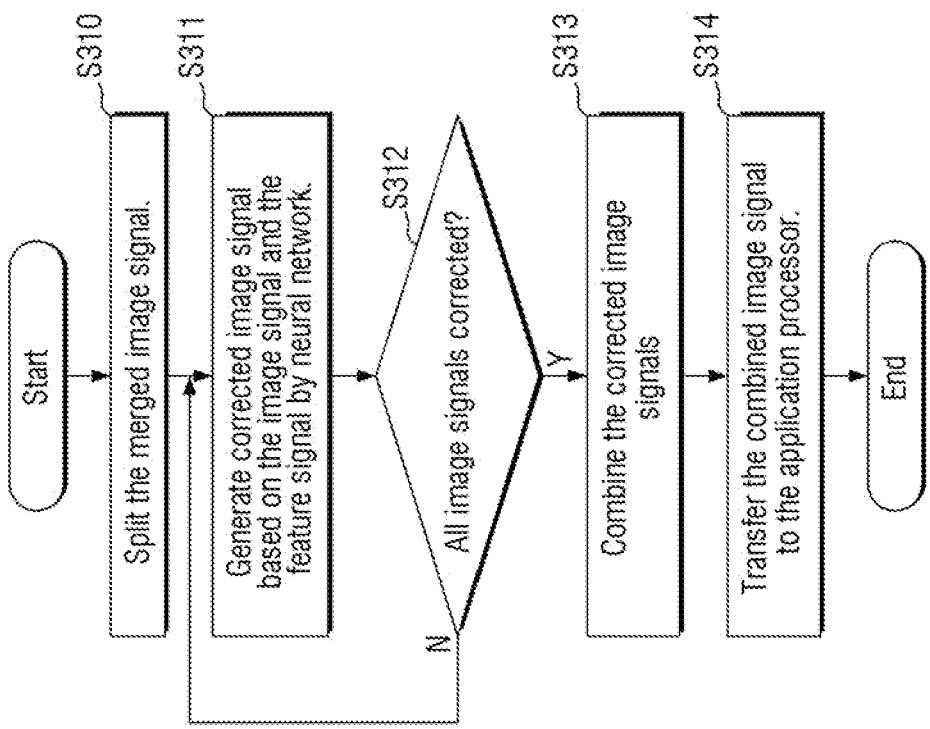
FIG. 13 is a flowchart for explaining the operations of the splitter, the second corrector and the combiner of FIG. 8, according to embodiments.

FIG. 12 is a block diagram illustrating operations of the splitter, the second corrector, and the combiner of FIG. 8. FIG. 13 is a flowchart for explaining the operations of the splitter, the second corrector and the combiner of FIG. 8.

Referring to FIGS. 12 and 13, the splitter 230 may receive the image signal IS'. The splitter 230 may split the image signal IS' into split image signals IS'_S and may output them at operation S310. As described above, the image signal IS' may include the global pixel values sensed during the unit frame interval and the feature values indicating whether to correct the global pixel values sensed during the unit frame interval. The splitter 230 may split the global pixel values sensed during the unit frame interval into different groups of sub-pixel values. That is, each group of the sub-pixel values may include local pixel values. In addition, the splitter 230 may split the feature values indicating whether to correct the global pixel values sensed during the unit frame interval, into different groups of sub-feature values.

For example, the pixel values included in the image signal IS' may be split into first sub-pixel values SP1 and second sub-pixel values SP2. For example, the feature values included in the image signal IS' may be split into first sub-feature values SF1 and second sub-feature value SF2.

The splitter 230 may output a first split image signal IS'_S1 including the first sub-pixel values SP1 and the first sub-feature values SF1, and a second split image signal IS'_S2 including the second sub-pixel values SP2 and the second sub-feature values SF2. In this case, the first sub-pixel values SP1 may correspond to the first sub-feature values SF1, and the second sub-pixel values SP2 may correspond to the second sub-feature values SF2.

The splitter 230 may provide the first and second split image signals IS'_S1 and IS'_S2 sequentially to the second corrector 240. Because the image signal IS' includes the global pixel values sensed during the unit frame interval and the feature values indicating whether to correct the pixel values, its capacity may be large, and the second corrector 240 may have memory limitations in processing. Therefore, by providing the first and second split image signals IS'_S1 and IS'_S2 sequentially to the second corrector 240 after being split, the performance of the image signal processor 200 may be enhanced.

The second corrector 240 may perform correction based on the first and second split image signals IS'_S1 and IS'_S2 that are sequentially provided. The second corrector 240 may output a corrected image signal IS'_C based on the sub-pixel values and the sub-feature values by a second neural network at operation S311. For example, the second corrector 240 may output a first corrected image signal IS'_C1 based on the first sub-pixel values SP1 and the first sub-feature values SF1 included in the first split image signal IS'_S1. In addition, the second corrector 240 may output a second corrected image signal IS'_C2 based on the second sub-pixel values SP2 and the second sub-feature values SF2 included in the second split image signal IS'_S2.

In this case, the first corrected image signal IS'_C1 and the second corrected image signal IS'_C2 may be sequentially output.

Further, the second corrector 240 may perform correction of at least one of a flare, haze, blur, or ghost on the first sub-pixel values SP1 using the first sub-pixel values SP1 and the first sub-feature values SF1. Further, the second corrector 240 may perform correction of at least one of a flare, haze, blur, or ghost on the second sub-pixel values SP2 using the second sub-pixel values SP2 and the second sub-feature values SF2. However, embodiments are not limited thereto.

In this case, the pixel values processed by the first corrector 210 may relate to information about an entire image, such as a flare or haze while the pixel values processed by the second corrector 240 may relate to information about a partial image, such as a blur or ghost. That is, the first corrector 210 may process the global pixel values sensed during the unit frame interval while the second corrector 240 may perform the correction by processing the split pixel values and the split feature values.

The first image signal processor 200 may determine whether all image signals have been corrected at operation S312. For example, if the correction for the global sub-pixel values is completed (Y at operation S312), the combiner 250 may combine the corrected image signals IS'_C at operation S313. For example, the combiner 250 may combine the first corrected image signals IS'_C1 and the second corrected image signal IS'_C2. The combiner 250 may output the image signal IS" obtained by combining the first and second corrected image signals IS'_C1 and IS'_C2. In embodiments, if all image signals have not been corrected (N at operation S312), operation S311 may be repeated.

The combiner 250 may transmit the image signal IS" to the application processor 300 at operation S314. Referring to FIG. 4, the image signal IS" may be transmitted to the second image signal processor 310 included in the application processor 300. In this case, the image signal IS" may include the image which is corrected for flare, haze, blur, and/or ghost. The second image signal processor 310 may perform image processing on the image signal IS". For example, the second image signal processor 310 may perform black level correction, defective pixel correction, shading correction, automatic exposure (AE) correction, automatic white balance (AWB) correction, and the like on the image signal IS". Further, the second image signal processor 310 may perform demosaicing, edge emphasizing, gamma correction, and the like on the image signal IS".

The first image signal processor 200 may output the image signal IS" in which image quality deterioration, such as a flare, haze, blur or ghost of the image signal IS has been decreased. Therefore, it is possible to provide the electronic device 1 and the image sensing system, in which the product reliability is improved by decreasing the image quality deterioration.

Hereinafter, examples of the first image signal processor 200 according to some embodiments will be described with reference to FIGS. 14 and 15.

Figure 14:
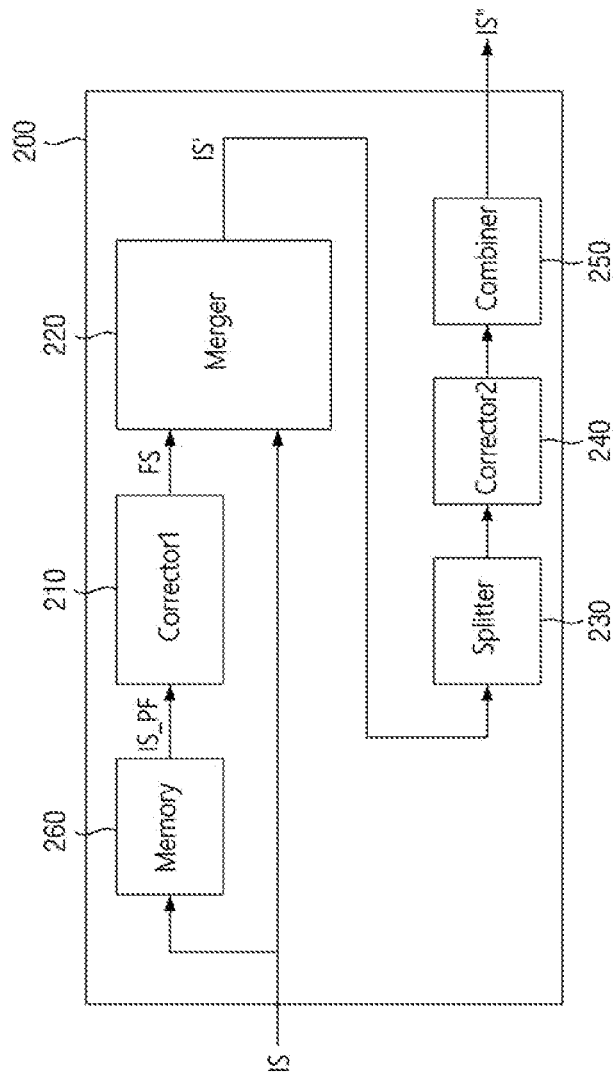
FIG. 14 is a block diagram illustrating a first image signal processor according to embodiments.

FIG. 14 is a block diagram illustrating a first image signal processor according to some embodiments. FIG. 15 is a flowchart illustrating an operation of the first image signal processor of FIG. 14. For simplicity of description, some redundant description with respect to FIGS. 1 to 13 will be omitted.

Referring to FIG. 14, the first image signal processor 200 may include a memory 260. The memory 260 may be connected to the first corrector 210. Further, the memory 260 may be connected to the image sensor 100 to receive the image signal IS.

Figure 15:
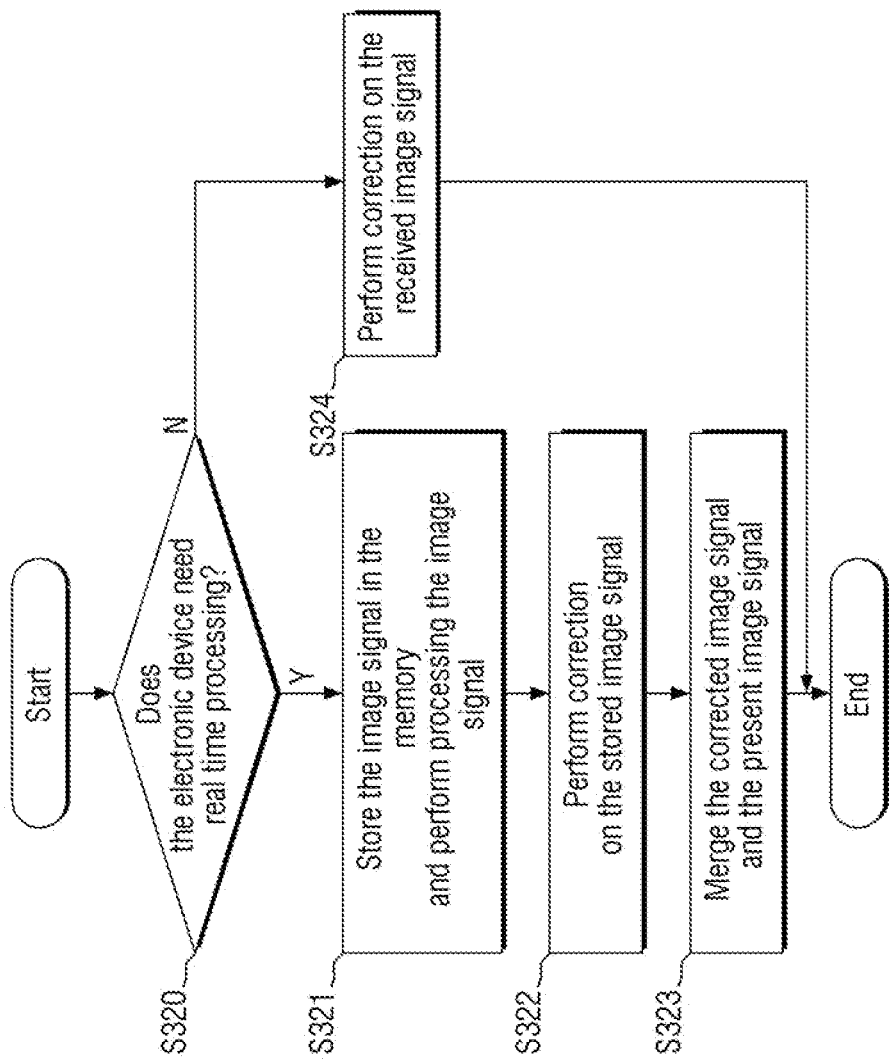
FIG. 15 is a flowchart illustrating an operation of the first image signal processor of FIG. 14, according to embodiments.

Referring to FIGS. 14 and 15, the first image signal processor 200 may determine whether the electronic device 1 needs or is using real time processing at operation S320. For example, video recording may correspond to real time processing, but photographing may not correspond to real time processing.

When the electronic device 1 needs real time processing (Y at operation S320), the memory 260 may store the image signal IS, and the first image signal processor 200 may perform image processing on the image signal IS at operation S321. For example, image processing on the image signal IS may be performed using only the merger 220, the splitter 230, the second corrector 240, and the combiner 250, and not the first corrector 210. In this case, the image signal IS stored in the memory 260 may include the global pixel values sensed during the unit frame interval.

When the electronic device 1 does not need real time processing (N at step S320), the first image signal processor 200 may perform correction using the image signal IS at operation S324.

After the correction for the image signal IS is completed, the first image signal processor 200 may perform correction on the stored image signal at operation S322. For example, the memory 260 may provide a previous frame image signal IS_PF to the first corrector 210. The first corrector 210 may provide the feature signal FS to the merger 220 based thereon.

The merger 220 may merge the feature signal FS generated based on the previous frame image signal IS_PF with the image signal IS provided during the subsequent unit frame interval at operation S323. Unlike the first image signal processor 200 described with reference to FIGS. 1 to 13, the merger 220 of the present embodiment may merge the feature signal FS based on the previous frame with the image signal IS based on the current frame. Accordingly, in the case of video recording other than photographing, the first image signal processor 200 may correct the image signal IS based on the previous frame image signal IS_PF and the image signal IS.

Hereinafter, a communication system 3 according to some embodiments will be described with reference to FIGS. 16 and 17.

Figure 16:
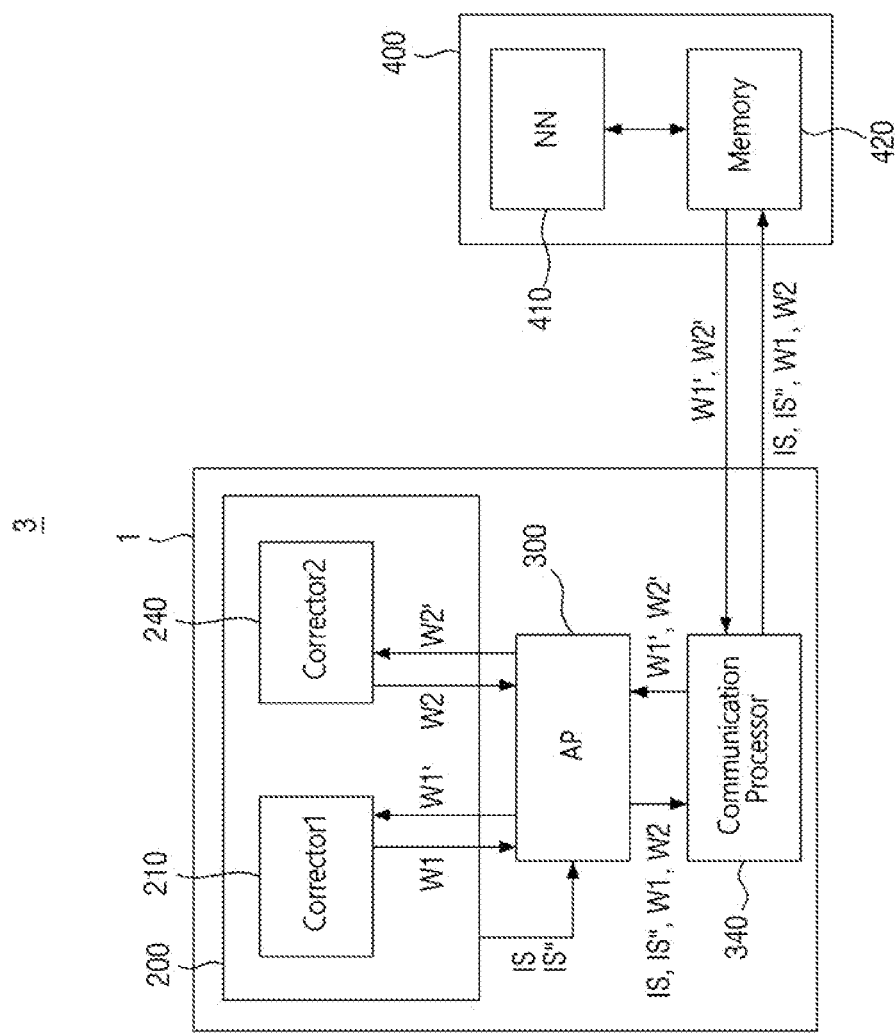
FIG. 16 is a block diagram illustrating a communication system according to embodiments.
Figure 17:
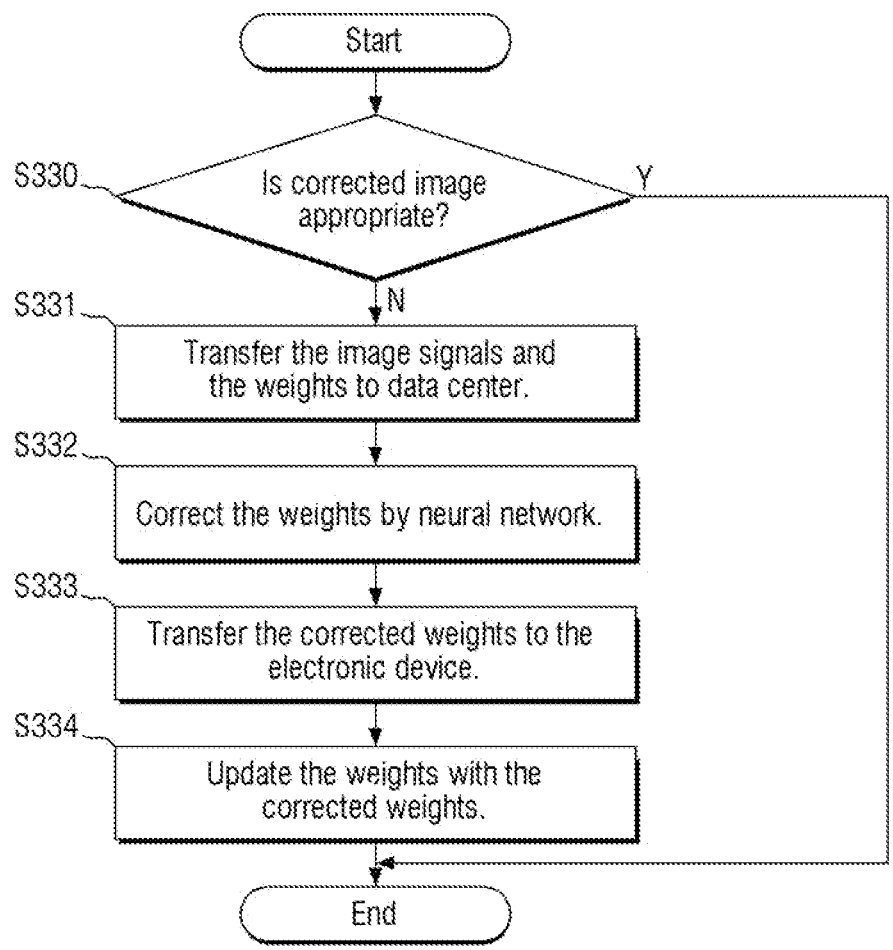
FIG. 17 is a block diagram illustrating an operation of the communication system of FIG. 16, according to embodiments.

FIG. 16 is a block diagram illustrating a communication system according to some embodiments. FIG. 17 is a block diagram illustrating an operation of the communication system of FIG. 16. For simplicity of description, some redundant description with respect to FIGS. 1 to 13 will be omitted.

Referring to FIG. 16, a communication system 3 may include the electronic device 1 and a data center 400. The electronic device 1 may include a communication processor 340. The data center 400 may include a neural network 410 and a memory 420. The electronic device 1 may exchange signals with the data center 400 through the communication processor 340.

The first corrector 210 may extract the feature signal FS using a first weight W1. For example, the first neural network 212 may use the first weight W1. The second corrector 240 may generate the corrected image signal IS'_C using a second weight W2. For example, the second neural network of the second corrector 240 may use the second weight W2.

The application processor 300 may receive the first weight W1 from the first corrector 210, and the second weight W2 from the second corrector 240, and may receive the image signals IS and IS" from the first image signal processor 200.

The application processor 300 may determine whether the image corrected by the first image signal processor 200 is appropriately corrected or not at operation S330. For example, the application processor 300 may determine whether the image signal IS" includes an appropriately corrected image based on the received image signals IS and IS". That is, the application processor 300 may compare the image signal IS with the image signal IS".

When the corrected image signal IS" is not appropriate (N at step S330), the electronic device 1 may transmit the image signals and the weights to the data center 400 at operation S331. For example, the application processor 300 may transmit the image signals IS and IS", and the first and second weights W1 and W2 to the communication processor 340. The communication processor 340 may transmit the image signals IS and IS", and first and second weights W1 and W2 to the data center 400 via an antenna.

The memory 420 of the data center 400 may store the received image signals IS and IS", and first and second weights W1 and W2. The data center 400 may generate a first weight W1' and a second weight W2' that have been corrected based on the image signals IS and IS", and the first and second weights W1 and W2 through the neural network 410 at operation S332.

The data center 400 may provide the corrected first and second weights W1' and W2' to the electronic device 1 at operation S333. The communication processor 340 may transmit the received first and second weights W1' and W2' to the application processor 300. The application processor 300 may transmit the first weight W1' to the first corrector 210, and the second weight W2' to the second corrector 240.

Through this operation, the first and second weights W1 and W2 may be updated with the received first and second weights W1' and W2' at operation S334. That is, when the output image applied with the first and second weights W1 and W2 of the first image signal processor 200 is inappropriate, the first and second weights W1 and W2 may be updated with the first and second weights W1' and W2'. Accordingly, the image quality deterioration can be decreased, and thus it is possible to provide the electronic device 1 and the communication system 3 including the same, in which the product reliability is improved.

When the corrected image signal IS" is appropriate (Y at step S330), operations S331 through S334 may be skipped, or not performed.

Hereinafter, an image sensing system 4 according to some embodiments will be described with reference to FIG. 18.

Figure 18:
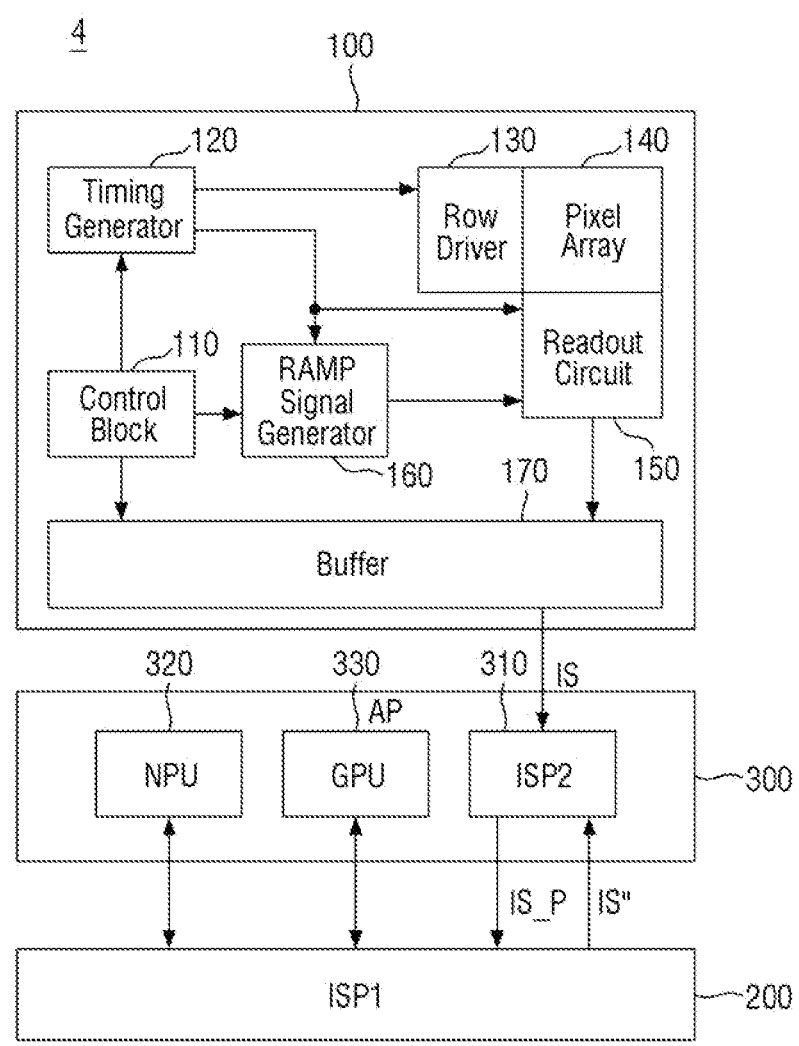
FIG. 18 is a block diagram illustrating an image sensing system according to embodiments.

FIG. 18 is a block diagram illustrating an image sensing system according to some embodiments. For simplicity of description, redundant description with respect to FIGS. 1 to 13 will be omitted.

Referring to FIG. 18, the application processor 300 may receive the image signal IS from the image sensor 100. For example, the second image signal processor 310 may receive the image signal IS from the image sensor 100. The second image signal processor 310 may perform correction on the image signal IS and may provide a corrected image signal IS_P to the first image signal processor 200. Unlike the image sensing system 2 described with reference to FIGS. 1 to 13, the first image signal processor 200 of the image sensing system 4 may receive the image signal IS_P that has already been corrected by the second image signal processor 310.

The first image signal processor 200 may provide an image signal IS" obtained by correcting the image signal IS_P back to the second image signal processor 310.

Hereinafter, an image sensing system 5 according to some other embodiments will be described with reference to FIG. 19.

Figure 19:
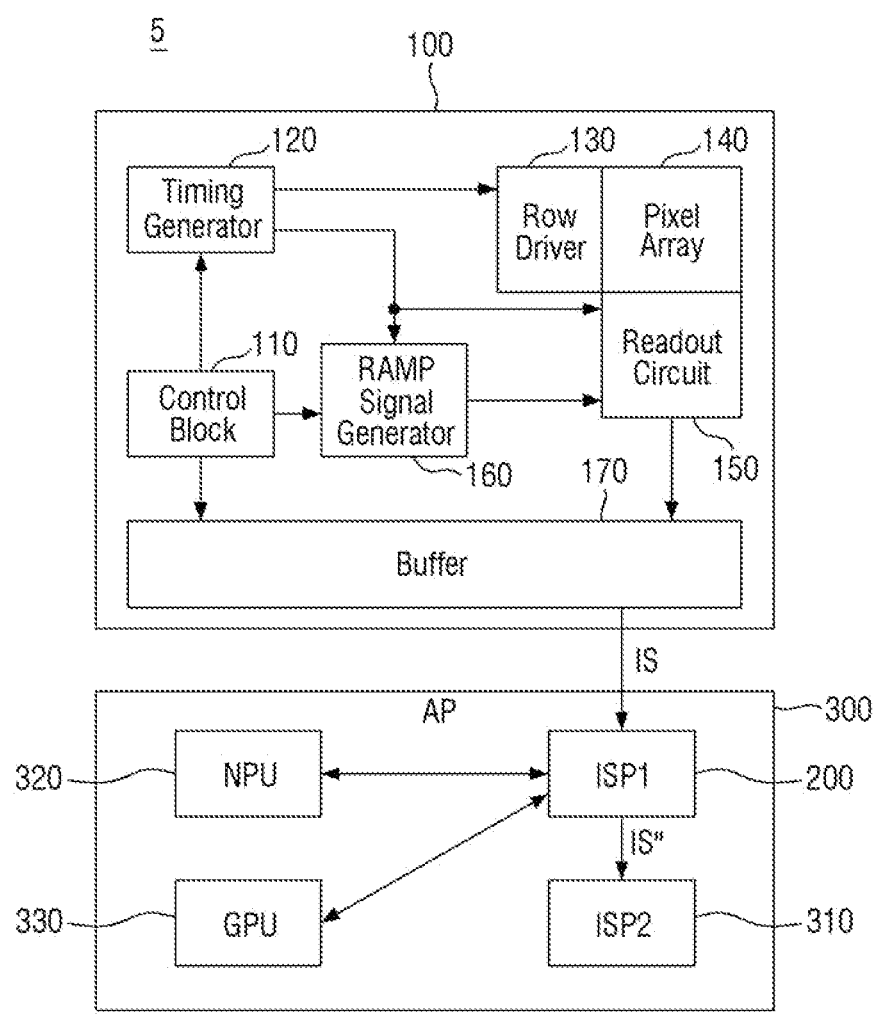
FIG. 19 is a block diagram illustrating an image sensing system according to embodiments.

FIG. 19 is a block diagram illustrating an image sensing system according to some embodiments. For simplicity of description, some redundant description with respect to FIGS. 1 to 13 will be omitted.

Referring to FIG. 19, an image sensing system 5 may include the image sensor 100 and the application processor 300. In this case, the application processor 300 may include the first image signal processor 200. That is, unlike the image sensing system 2 described with reference to FIGS. 1 to 13, in which the first image signal processor 200 and the application processor 300 are separated, in the image sensing system 5, the first image signal processor 200 may be included in the application processor 300.

Hereinafter, an electronic device 6 according to some other embodiments will be described with reference to FIGS. 20 and 21.

Figure 20:
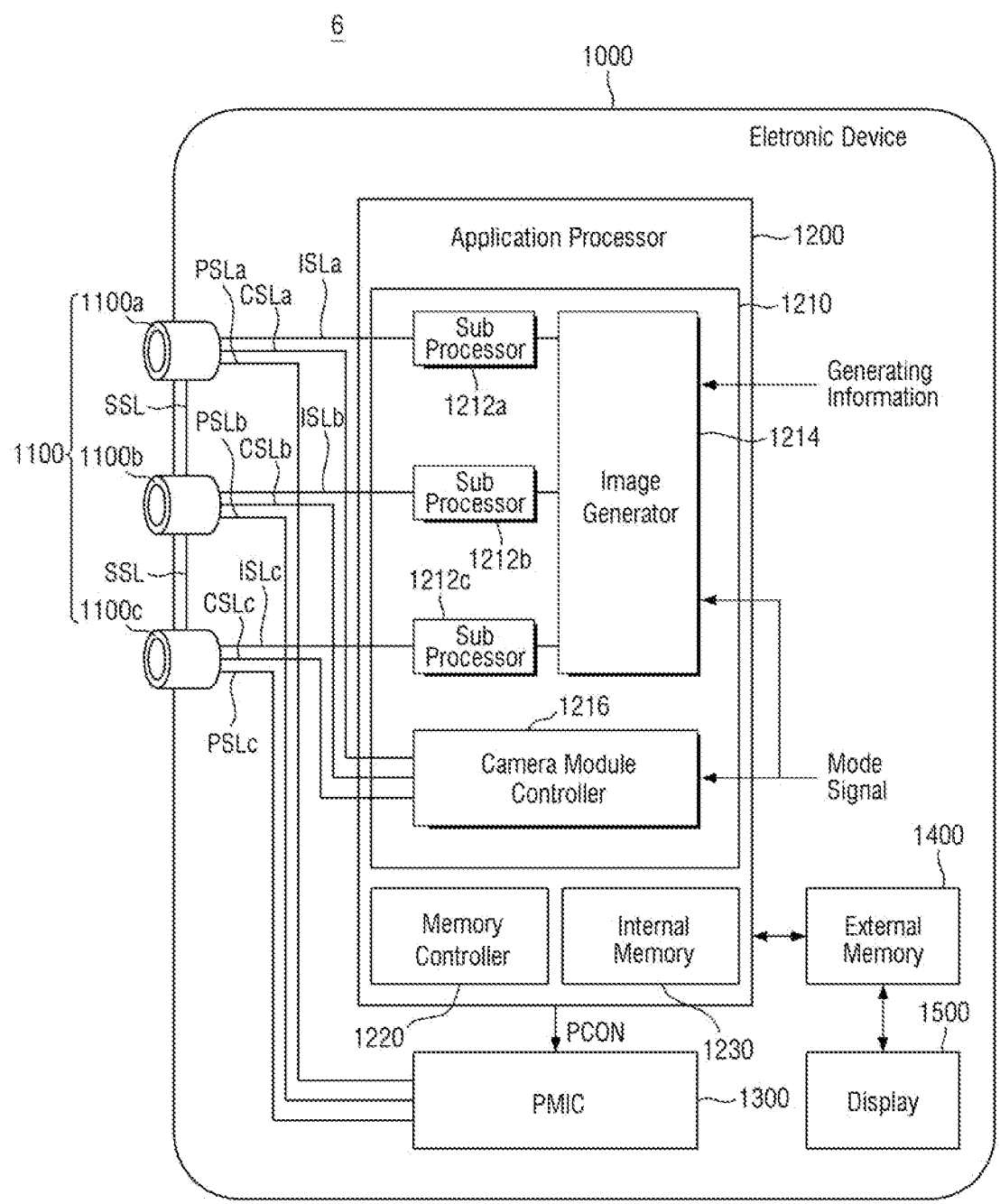
FIG. 20 is a block diagram for describing an electronic device including a multi-camera module according to embodiments.

FIG. 20 is a block diagram for describing an electronic device including a multi-camera module according to some embodiments. FIG. 21 is a detailed block diagram of the camera module of FIG. 20. For simplicity of description, some redundant description with respect to FIGS. 1 to 19 will be omitted.

Referring to FIG. 20, an electronic device 6 may include a camera module group 1100, an application processor 1200, a power management integrated circuit (PMIC) 1300, an external memory 1400, and a display 1500.

The camera module group 1100 may include a plurality of camera modules 1100a, 1100b, and 1100c. Although the drawing illustrates an embodiment in which three camera modules 1100a, 1100b, and 1100c are disposed, embodiments are not limited thereto. In some embodiments, the camera module group 1100 may be modified to include only two camera modules. In addition, in some embodiments, the camera module group 1100 may be modified to include n camera modules, where n may be a natural number greater than 3.

In this embodiment, one of the three camera modules 1100a, 1100b, and 1100c may be a camera module including the image sensor 100 described with reference to FIGS. 1 to 19. Alternatively, one of the three camera modules 1100a, 1100b, and 1100c may be a camera module including the image sensor 100 and the first image signal processor 200 described with reference to FIGS. 1 to 19. In embodiments, one of the three camera modules 1100a, 1100b, and 1100c may be a camera module including the image sensor 101 described with reference to FIGS. 1 to 3.

Hereinafter, a detailed configuration of the camera module 1100b will be described with reference to FIG. 21. The following description may be equally applied to other camera modules 1100a and 1100c according to embodiments.

Figure 21:
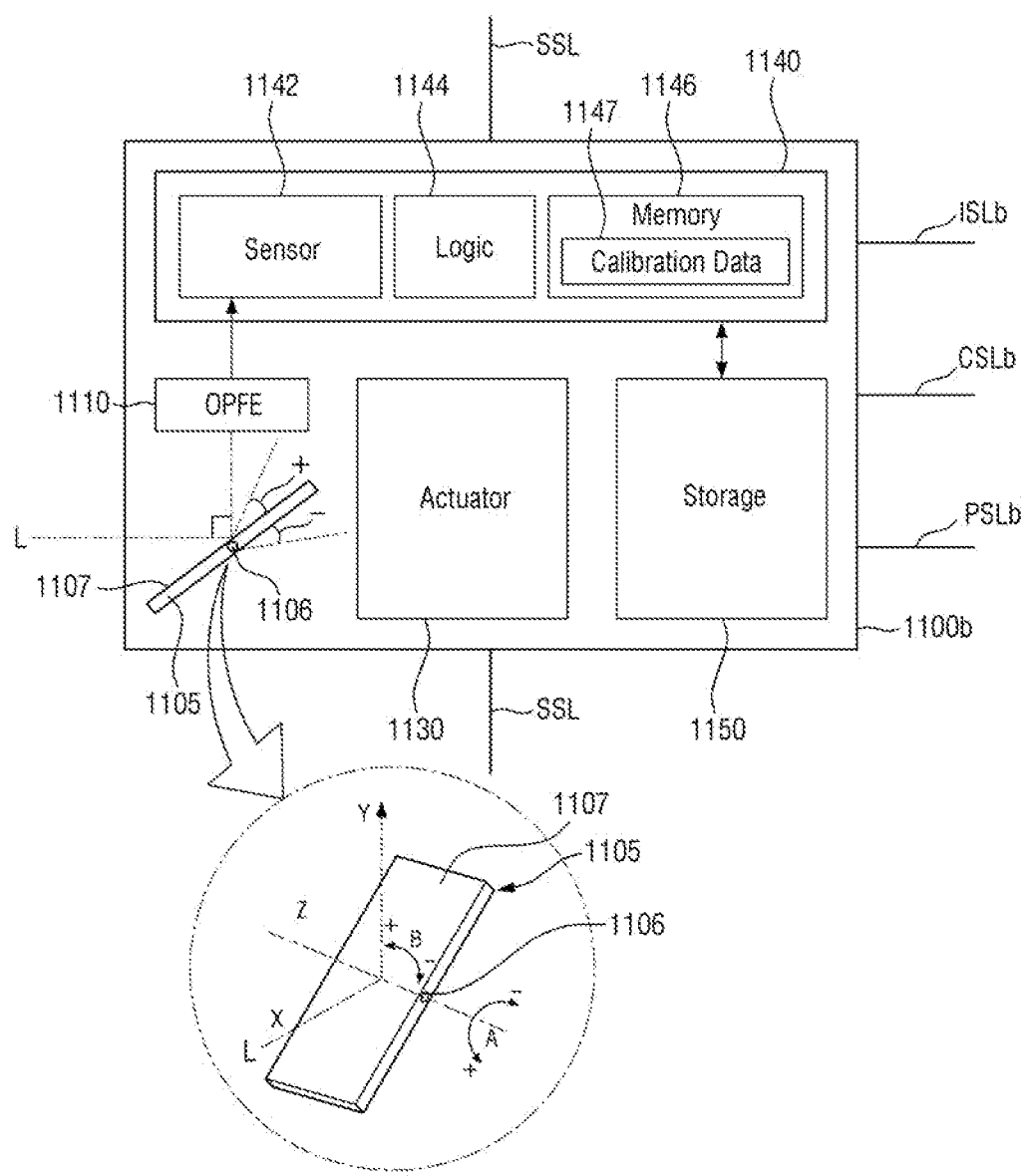
FIG. 21 is a detailed block diagram of the camera module of FIG. 20, according to embodiments.

Referring to FIG. 21, the camera module 1100b may include a prism 1105, an optical path folding element (hereinafter, referred to as "OPFE") 1110, an actuator 1130, an image sensing unit 1140, and a storage unit 1150.

The prism 1105 may include a reflective surface 1107 having a light reflecting material and change the path of light L incident from the outside.

In some embodiments, the prism 1105 may change the path of the light L incident in a direction X to a direction Y perpendicular to the direction X. Further, the prism 1105 may rotate the reflective surface 1107 having the light reflecting material with respect to a central axis 1106 in an A direction, or rotate the central axis 1106 in a B direction, thereby changing the path of the light L incident in the direction X to the direction Y perpendicular thereto. In this case, the OPFE 1110 may also move in a direction Z perpendicular to the direction X and the direction Y.

In some embodiments, as shown in the drawing, the maximum rotation angle of the prism 1105 in the A direction may be 15 degrees or less in the positive (+) A direction and greater than 15 degrees in the negative (−) A direction. However, embodiments are not limited thereto.

In some embodiments, the prism 1105 may move about 20 degrees, between 10 and 20 degrees, or between 15 and 20 degrees in the positive (+) or negative (−) B direction. In this case, the moving angle may be the same in the positive (+) or negative (−) B direction or may be almost the same in the positive (+) or negative (−) B directions with a difference of about 1 degree.

In some embodiments, the prism 1105 may move the reflective surface 1107 having the light reflecting material in the third direction, for example direction Z, parallel to the extending direction of the central axis 1106.

The OPFE 1110 may include, for example, m optical lenses, where m may be a natural number. The m lenses may move in the second direction Y to change an optical zoom ratio of the camera module 1100b. For example, if it is assumed that a basic optical zoom ratio of the camera module 1100b is Z, the optical zoom ratio of the camera module 1100b may become 3Z, 5Z or more as the m optical lenses included in the OPFE 1110 are moved.

The actuator 1130 may move or the optical lenses or the OPFE 1110 (hereinafter, referred to as "optical lens") to a specific position. For example, the actuator 1130 may adjust the position of the optical lens so that an image sensor 1142 may be positioned at a focal length of the optical lens for accurate sensing.

The image sensing unit 1140 may include the image sensor 1142, a control logic 1144, and a memory 1146. The image sensor 1142 may sense an image of a sensing target using the light L provided through the optical lens. In some embodiments, the image sensor 1142 may include the image sensor 100 described above.

The control logic 1144 may control the overall operation of the camera module 1100b. For example, the control logic 1144 may control the operation of the camera module 1100b according to a control signal provided through a control signal line CSLb.

The memory 1146 may store information such as calibration data 1147 that is necessary for the operation of the camera module 1100b. The calibration data 1147 may include information necessary for the camera module 1100b to generate image data using the light L provided from the outside. The calibration data 1147 may include, for example, information about an optical axis, information about the degree of rotation, and information about the focal length described above. When the camera module 1100b is implemented in the form of a multi-state camera whose focal length varies according to the position of the optical lens, the calibration data 1147 may include information about auto focusing and a focal length value for each position (or state) of the optical lens.

The storage unit 1150 may store image data sensed through the image sensor 1142. The storage unit 1150 may be disposed outside the image sensing unit 1140, and may be implemented in a form of being stacked with a sensor chip included in the image sensing unit 1140. In some embodiments, the storage unit 1150 may be implemented as an electrically erasable programmable read-only memory (EEPROM), but embodiments are not limited thereto.

Referring to FIGS. 20 and 21 together, in some embodiments, each of the camera modules 1100a, 1100b, and 1100c may include the actuator 1130. Accordingly, the camera modules 1100a, 1100b, and 1100c may respectively include the calibration data 1147 that are the same or different according to the operation of the actuators 1130 included therein.

In some embodiments, one camera module, for example camera module 1100b, among the camera modules 1100a, 1100b and 1100c may be a camera module of a folded lens type including the prism 1105 and the OPFE 1110 described above, and the remaining camera modules, for example camera modules 1100a and 1100c, may be camera modules of a vertical type, which do not include the prism 1105 and the OPFE 1110. However, embodiments are not limited thereto.

In some embodiments, one camera module, camera module 1100c) among the camera modules 1100a, 1100b and 1100c may be a depth camera of a vertical type that extracts depth information using, for example, infrared rays (IR). In this case, an application processor 1200 may merge image data provided from the depth camera with image data provided from another camera module, for example camera module 1100a or 1100b, to generate a three dimensional (3D) depth image.

In some embodiments, among the camera modules 1100a, 1100b, and 1100c, at least two camera modules, for example camera modules 1100a and 1100c, may have different fields of view (viewing angles). In this case, among the camera modules 1100a, 1100b, and 1100c, for example, at least two camera modules, for example camera modules 1100a and 1100c, may have different optical lenses, but are not limited thereto.

Further, in some embodiments, the camera modules 1100a, 1100b, and 1100c may have different viewing angles. In this case, optical lenses included in the respective camera modules 1100a, 1100b, and 1100c may also be different, but the present disclosure is not limited thereto.

In some embodiments, the camera modules 1100a, 1100b, and 1100c may be disposed to be physically separated from each other. That is, the sensing area of one image sensor 1142 is not divided and used by the camera modules 1100a, 1100b, and 1100c, but an independent image sensor 1142 may be disposed inside each of the camera modules 1100a, 1100b, and 1100c.

Referring back to FIG. 20, the application processor 1200 may include an image processing unit 1210, a memory controller 1220, and an internal memory 1230. The application processor 1200 may be implemented separately from the camera modules 1100a, 1100b, and 1100c. For example, the application processor 1200 and the camera modules 1100a, 1100b, and 1100c may be implemented separately as separate semiconductor chips.

The image processing unit 1210 may include a plurality of sub-image processors 1212a, 1212b, and 1212c, an image generator 1214, and a camera module controller 1216.

The image processing unit 1210 may include the sub-image processors 1212a, 1212b, and 1212c, the number of which corresponds to the number of the camera modules 1100a, 1100b, and 1100c. In some embodiments, each of the sub-image processors 1212a, 1212b, and 1212c may include the first image signal processor 200 described above.

Image data generated from the respective camera modules 1100a, 1100b, and 1100c may be provided to the corresponding sub-image processors 1212a, 1212b, and 1212c through separate image signal lines ISLa, ISLb, and ISLc. For example, image data generated from the camera module 1100a may be provided to the sub-image processor 1212a through the image signal line ISLa, image data generated from the camera module 1100b may be provided to the sub-image processor 1212b through the image signal line ISLb, and image data generated from the camera module 1100c may be provided to the sub-image processor 1212c through the image signal line ISLc. For example, such image data transmission may be performed using a camera serial interface (CSI) based on a mobile industry processor interface (MIPI), but embodiments are not limited thereto.

In some embodiments, one sub-image processor may be arranged to correspond to a plurality of camera modules. For example, the sub-image processor 1212a and the sub-image processor 1212c may be integrated into one sub-image processor without being separated from each other as shown, and image data provided from the camera module 1100a and the camera module 1100c may be selected by a data selector, for example a multiplexer, or the like, and then provided to the integrated sub-image processor.

The image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generation information or a mode signal.

Specifically, according to the image generation information or the mode signal, the image generator 1214 may generate an output image by merging at least some of the image data generated from the camera modules 1100a, 1100b and 1100c having different viewing angles. Further, according to the image generation information or the mode signal, the image generator 1214 may generate an output image by selecting any one of image data generated from camera modules 1100a, 1100b and 1100c having different viewing angles.

In some embodiments, the image data provided to the image generator 1214 may include the image signal IS" output by the first image signal processor 200 described above.

In some embodiments, the image generation information may include a zoom signal (or zoom factor). Further, in some embodiments, the mode signal may be a signal based on, for example, a mode selected by a user.

When the image generation information is a zoom signal or zoom factor, and the camera modules 1100a, 1100b, and 1100c have different fields of view or viewing angles, the image generator 1214 may perform a different operation depending on the type of the zoom signal. For example, when the zoom signal is a first signal, image data output from the camera module 1100a may be merged with image data output from the camera module 1100c, and then an output image may be generated using the merged image signal and image data that is output from the camera module 1100b not used for merging. When the zoom signal is a second signal that is different from the first signal, the image generator 1214 does not perform the image data merging, but may generate an output image by selecting any one of image data output from the camera module 1100a, 1100b, and 1100c. However, embodiments are not limited thereto, and the method of processing image data may be variously modified as needed.

In some embodiments, the image generator 1214 may receive a plurality of image data having different exposure times from at least one of the sub-image processors 1212a, 1212b, and 1212c, and perform the high dynamic range (HDR) processing on the plurality of image data, thereby generating merged image data with an increased dynamic range.

The camera module controller 1216 may provide a control signal to each of the camera modules 1100a, 1100b, and 1100c. The control signals generated from the camera module controller 1216 may be provided to the corresponding camera modules 1100a, 1100b, and 1100c through the separated control signal lines CSLa, CSLb, and CSLc.

Any one, for example camera module 1100a, of the camera modules 1100a, 1100b and 1100c may be designated as a master camera according to the mode signal or the image generation information including the zoom signal, and the remaining camera modules, for example camera modules 1100b and 1100c, may be designated as slave cameras. Such information may be included in the control signals to be provided to the corresponding camera modules 1100a, 1100b, and 1100c through the separate control signal lines CSLa, CSLb, and CSLc.

The camera modules operating as the master and the slaves may be changed according to the zoom factor or the operation mode signal. For example, when the viewing angle of the camera module 1100a is wider than the viewing angle of the camera module 1100c and the zoom factor indicates a low zoom ratio, the camera module 1100c may operate as a master, and the camera module 1100a may operate as a slave. On the contrary, when the zoom factor indicates a high zoom ratio, the camera module 1100a may operate as a master, and the camera module 1100c may operate as a slave.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b having received the sync enable signal may generate a sync signal based on the received sync enable signal, and transmit the generated sync signal to the camera modules 1100a and 1100c through sync signal lines SSL. Based on the sync signal, the camera modules 1100a, 1100b and 1100c may synchronously transmit image data to the application processor 1200.

In some embodiments, the control signal provided from the camera module controller 1216 to the camera modules 1100a, 1100b, and 1100c may include mode information according to the mode signal. Based on the mode information, the camera modules 1100a, 1100b, and 1100c may operate in a first operation mode or a second operation mode in relation to a sensing rate.

In the first operation mode, the camera modules 1100a, 1100b, and 1100c may generate an image signal at a first rate, for example a first frame rate, and encode it at a second rate, for example a second frame rate higher than first frame rate, higher than the first rate, and transmit the encoded image signal to the application processor 1200. In this case, the second rate may be 30 times or less the first rate.

The application processor 1200 may store the received image signal, that is, the encoded image signal, in the memory 1230 provided therein or in a memory 1400 provided outside the application processor 1200. Then, the application processor 1200 may read out the encoded image signal from the memory 1230 or the memory 1400 to decode it, and display image data generated based on the decoded image signal. For example, a corresponding sub-processor among the sub-image processors 1212a, 1212b, and 1212c of the image processing unit 1210 may perform decoding and may also perform image processing on the decoded image signal. For example, the image data generated based on the decoded image signal may be displayed on the display 1500.

In the second operation mode, the camera modules 1100a, 1100b, and 1100c may generate an image signal at a third rate, for example third frame rate lower than first frame rate, lower than the first rate and transmit the image signal to the application processor 1200. The image signal provided to the application processor 1200 may be an unencoded signal. The application processor 1200 may perform image processing on the received image signal or store the image signal in the memory 1230 or the memory 1400.

The PMIC 1300 may supply power, such as a source voltage, to each of the camera modules 1100a, 1100b, and 1100c. For example, the PMIC 1300 may supply first power to the camera module 1100a through a power signal line PSLa, second power to the camera module 1100b through a power signal line PSLb and third power to the camera module 1100c through a power signal line PSLc under the control of the application processor 1200.

The PMIC 1300 may generate power corresponding to each of the camera modules 1100a, 1100b, and 1100c in response to a power control signal PCON from the application processor 1200, and may also adjust a power level. The power control signal PCON may include a power adjustment signal for each operation mode of the camera modules 1100a, 1100b, and 1100c. For example, the operation mode may include a low power mode, and in this case, the power control signal PCON may include information about a camera module operating in the low power mode and a set power level. Levels of powers provided to the respective camera modules 1100a, 1100b, and 1100c may be the same or different. Further, the levels of powers may be dynamically changed.

In concluding the detailed description, those skilled in the art will appreciate that many variations and modifications can be made to embodiments without substantially departing from the principles of the present disclosure. Therefore, embodiments are used in a generic and descriptive sense only and not for purposes of limitation.

What is claimed is:

1. An image processing device comprising:
a memory; and
at least one image signal processor configured to:
  generate, using a first neural network, a feature value indicating whether to correct a global pixel value sensed during a unit frame interval, and generate a feature signal including the feature value;
  generate an image signal by merging the global pixel value with the feature signal;
  split a pixel value included in the image signal into a first sub-pixel value and a second sub-pixel value, split a frame feature signal included in the image signal into a first sub-feature value corresponding to the first sub-pixel value and a second sub-feature value corresponding to the second sub-pixel value, and generate a first sub-image signal including the first sub-pixel value and the first sub-feature value, and a second sub-image signal including the second sub-pixel value and the second sub-feature value; and
  sequentially correct the first sub-image signal and the second sub-image signal using a second neural network.

2. The image processing device of claim 1, wherein the at least one image signal processor is further configured to generate a downscaled pixel value by encoding the global pixel value.

3. The image processing device of claim 2, wherein the at least one image signal processor is further configured to extract an original feature value from the downscaled pixel value using the first neural network.

4. The image processing device of claim 3, wherein the at least one image signal processor is further configured to decode the extracted original feature value to generate the feature value indicating whether to correct the global pixel value.

5. The image processing device of claim 1, wherein the memory is configured to store the global pixel value, and provide the stored global pixel value to the at least one image signal processor.

6. The image processing device of claim 1, wherein the first neural network includes a plurality of layers for processing the global pixel value,
wherein the second neural network includes a plurality of layers for processing the first sub-image signal and the second sub-image signal, and
wherein the first neural network is different from the second neural network.

7. The image processing device of claim 1, wherein the feature value indicates whether a flare or haze occurs in the global pixel value.

8. The image processing device of claim 7, wherein the at least one image signal processor is further configured to perform correction for an occurrence of a blur or a ghosting in the first sub-image signal and the second sub-image signal.

9. The image processing device of claim 1, wherein the memory is further configured to store a first frame image and provide the stored first frame image to the at least one image signal processor, and
wherein the at least one image signal processor is further configured to generate a corrected feature value indicating whether the first frame image is corrected, and generate a corrected feature signal including the corrected feature value, and merge the corrected feature signal with a second frame image following the first frame image.

10. The image processing device of claim 1, wherein the at least one image signal processor is further configured to generate a signal obtained by combining the first sub-image signal and the second sub-image signal.

11. The image processing device of claim 10, wherein the signal obtained by combining the first sub-image signal and the second sub-image signal is transmitted to an application processor.

12. An electronic device comprising:
an image sensor configured to sense light passing through a display, and output a first image signal including a global pixel value sensed during a unit frame interval; and
an image signal processor connected to the image sensor and configured to: receive the first image signal;
generate a second image signal obtained by correcting the global pixel value included in the first image signal using a first neural network;
split the first image signal into a first sub-image signal and a second sub-image signal, and split the second image signal into a third sub-image signal and a fourth sub-image signal; and
generate a first signal based on the first sub-image signal and the third sub-image signal using a second neural network, and generate a second signal based on the second sub-image signal and the fourth sub-image signal.

13. The electronic device of claim 12, wherein the electronic device includes a front surface and a rear surface,
wherein the display is disposed on the front surface, and
wherein the image sensor is configured to sense the light incident on the front surface.

14. The electronic device of claim 12, wherein the image signal processor is further configured to generate a third signal by combining the first signal and the second signal, and
wherein an image generated based on the third signal is output to the display.

15. The electronic device of claim 12, wherein the image sensor is configured to sense the light incident through a hole formed in the display.

16. The electronic device of claim 12, further comprising an application processor configured to receive the first signal and the second signal, and perform image processing on the first signal and the second signal.

17. The electronic device of claim 12, further comprising an application processor configured to connect the image sensor to the image signal processor, and
wherein the application processor is configured to receive the first image signal from the image sensor and provide a processed first image signal on which image processing has been performed to the image signal processor.

18. An electronic system comprising:
an electronic device including an image sensor, an image signal processor and a communication processor; and
a data center configured to exchange data with the communication processor,
wherein the image sensor is configured to output a first image signal including a global pixel value sensed during a unit frame interval, and provide the first image signal to the image signal processor,
wherein the image signal processor is configured to generate a second image signal using a first neural network based on a first weight and the first image signal provided from the image sensor, and generate a third image signal using a second neural network different from the first neural network based on a second weight, the first image signal, and the second image signal,
wherein the communication processor is configured to provide the first weight, the second weight, the first image signal, and the third image signal to the data center, and
the data center is configured to generate a third weight obtained by correcting the first weight, and a fourth weight obtained by correcting the second weight, based on the first weight, the second weight, the first image signal, and the third image signal, and provide the third weight and the fourth weight to the electronic device.

19. The electronic system of claim 18, wherein the first weight is updated based on the provided third weight, and the second weight is updated based on the provided fourth weight.

20. The electronic system of claim 18, wherein the data center includes a memory configured to store the third weight and the fourth weight.

* * * * *